(12) United States Patent
Wolfe et al.

(10) Patent No.: US 10,790,766 B2
(45) Date of Patent: Sep. 29, 2020

(54) DYNAMIC ENERGY HARVESTING AND VARIABLE HARVESTING FORCE SYSTEM

(71) Applicant: Schlage Lock Company LLC, Carmel, IN (US)

(72) Inventors: John A. Wolfe, Cicero, IN (US); Daniel Langenberg, Zionsville, IN (US); Michael Stock, Lakewood, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 16/506,736

(22) Filed: Jul. 9, 2019

(65) Prior Publication Data

US 2020/0007054 A1    Jan. 2, 2020

Related U.S. Application Data

(63) Continuation of application No. 15/962,357, filed on Apr. 25, 2018, now Pat. No. 10,348,221.

(51) Int. Cl.
  *H02P 3/14*       (2006.01)
  *H02P 7/29*       (2016.01)
  (Continued)

(52) U.S. Cl.
  CPC .............. *H02P 3/14* (2013.01); *E05F 15/611* (2015.01); *H02J 7/0068* (2013.01);
  (Continued)

(58) Field of Classification Search
  CPC ..................................... H02P 3/14; H02P 7/29
  (Continued)

(56) References Cited

U.S. PATENT DOCUMENTS 7,405,530 B2 * 7/2008 Keller, Jr. ............ G01D 18/008
                                                          318/266
7,489,093 B2    2/2009 King et al.
(Continued)

FOREIGN PATENT DOCUMENTS

WO        2014152907 A      9/2014

OTHER PUBLICATIONS

International Search Report; International Searching Authority; International Patent Application No. PCT/US2016/065312; dated Feb. 21, 2017; 2 pages.
(Continued)

*Primary Examiner* — David Luo
(74) *Attorney, Agent, or Firm* — Taft Stettinius & Hollister LLP

(57) ABSTRACT

A dynamic energy harvesting and variable harvesting force system is disclosed. A boost converter increases a motor voltage as a motor current associated with the motor voltage propagates through the boost converter thereby generating a boost voltage associated with the changing motor current. A power storage device stores energy harvested by the boost converter when the boost voltage exceeds an energy storage threshold. A controller dynamically adjusts a harvesting force applied by the motor so that the harvesting force is relative to the force applied to the motor. The controller also dynamically adjusts the harvested energy stored by the power storage device by adjusting the charging of the power storage device, ensuring that the boost voltage threshold is maintained. The boost voltage when maintained within the boost voltage threshold enables the power storage device to store the harvested energy without impacting the harvesting force applied by the motor.

20 Claims, 7 Drawing Sheets

(51) Int. Cl.
| | |
|---|---|
| *H02P 7/292* | (2016.01) |
| *H02J 7/00* | (2006.01) |
| *E05F 15/611* | (2015.01) |
| *H02J 7/34* | (2006.01) |
| *H02J 7/14* | (2006.01) |
| *H02M 3/158* | (2006.01) |
| *H02M 3/156* | (2006.01) |
| *H02M 1/00* | (2006.01) |

(52) U.S. Cl.
CPC ............ *H02J 7/1446* (2013.01); *H02J 7/345* (2013.01); *H02P 7/29* (2013.01); *H02P 7/292* (2013.01); *E05Y 2201/438* (2013.01); *E05Y 2400/612* (2013.01); *E05Y 2400/616* (2013.01); *E05Y 2900/132* (2013.01); *H02M 3/156* (2013.01); *H02M 3/1582* (2013.01); *H02M 2001/007* (2013.01); *H02P 2201/07* (2013.01)

(58) Field of Classification Search
USPC ...................................................... 318/3, 34
See application file for complete search history.

(56) References Cited

U.S. PATENT DOCUMENTS

| | | | |
|---|---|---|---|
| 7,646,165 B2 * | 1/2010 | Ueda ..................... | H02M 5/458 318/801 |
| 8,225,458 B1 | 7/2012 | Hoffberg | |
| 8,359,790 B2 | 1/2013 | Shin | |
| 8,384,236 B2 | 2/2013 | Fuma et al. | |
| 8,547,046 B2 * | 10/2013 | Burris ..................... | E05F 3/227 16/49 |
| 8,564,235 B2 | 10/2013 | Burris et al. | |
| 8,779,713 B2 | 7/2014 | Burris et al. | |
| 8,793,838 B2 | 8/2014 | McKibben et al. | |
| 8,938,912 B2 | 1/2015 | McKibben et al. | |
| 2011/0257797 A1 | 10/2011 | Burris et al. | |
| 2012/0210540 A1 | 8/2012 | McKibben et al. | |
| 2013/0340343 A1 | 12/2013 | Dye et al. | |
| 2014/0330436 A1 | 11/2014 | Copeland, II et al. | |
| 2014/0346997 A1 | 11/2014 | Salutzki et al. | |
| 2015/0135601 A1 | 5/2015 | McKibben et al. | |
| 2015/0159988 A1 | 6/2015 | Essawy | |

OTHER PUBLICATIONS

International Written Opinion; International Searching Authority; International Patent Application No. PCT/US2016/065312; dated Feb. 21, 2017; 6 pages.

International Search Report; International Searching Authority; International Patent Application No. PCT/US2019/029145; dated Jul. 8, 2019; 2 pages.

Written Opinion; International Searching Authority; International Patent Application No. PCT/US2019/029145; dated Jul. 8, 2019; 3 pages.

* cited by examiner

DYNAMIC ENERGY HARVESTING AND VARIABLE HARVESTING FORCE SYSTEM

CROSS-REFERENCE TO RELATED APPLICATIONS

The present application is a continuation of U.S. patent application Ser. No. 15/962,357 filed Apr. 25, 2018 and issued as U.S. Pat. No. 10,348,221, the contents of which are incorporated herein by reference in their entirety.

BACKGROUND

Field of Disclosure

The present disclosure generally relates to harvesting energy to be stored by a power storage device.

Related Art

Conventional energy harvesting and variable force systems, such as conventional door control devices that control the amount of force applied to the door while harvesting energy from the force applied to the door by the user, typically require multiple controllers to control each individual aspect and thus unnecessarily increases the cost of the system. For example, conventional systems have a controller that controls the input and output power to a motor, which then changes the force from the motor, such as the amount of force applied to the door as the door closes and/or opens. An additional controller then controls the energy harvesting, such as the energy harvested from the force applied to the door by the user. An additional controller then also controls the storage of the harvested energy as well another controller that controls the retrieval of the harvested energy.

Further conventional energy harvesting and variable force systems also have an energy storage device, such as a battery, that behaves greedily where the energy storage device takes all available harvested energy by the conventional energy harvesting and variable force system as quickly as possible, impacting the performance of the harvesting system. In doing so, the device impacts the energy from the motor, impacting the force applied to the door as the door closes and/or opens, causing lower power conversion efficiency and causing the door to feel heavy to the user.

Further conventional energy harvesting and variable force systems, such as exercise equipment, vary the energy that is harvested based on the rotation per minute (RPM) of the system. However, the setting of the energy harvesting based on the RPM of the system is executed by the user manually programming the amount of energy harvested which then translates to the amount of force applied to the system, such as the exercise equipment. For example, the user manually adjusts the energy harvesting based on the RPM when the user wants an increase in force applied to the exercise equipment thereby increasing the effort required by the user to complete the workout as well as manually adjusting the energy harvesting when the user wants to decrease the force applied to the exercise equipment thereby easing the effort required by the user to complete the workout. This conventional approach creates a customized solution tuned by each individual, rather than a global solution that fits every scenario.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number typically identifies the drawing in which the reference number first appears.

DETAILED DESCRIPTION OF THE PRESENT DISCLOSURE

Figure 1:
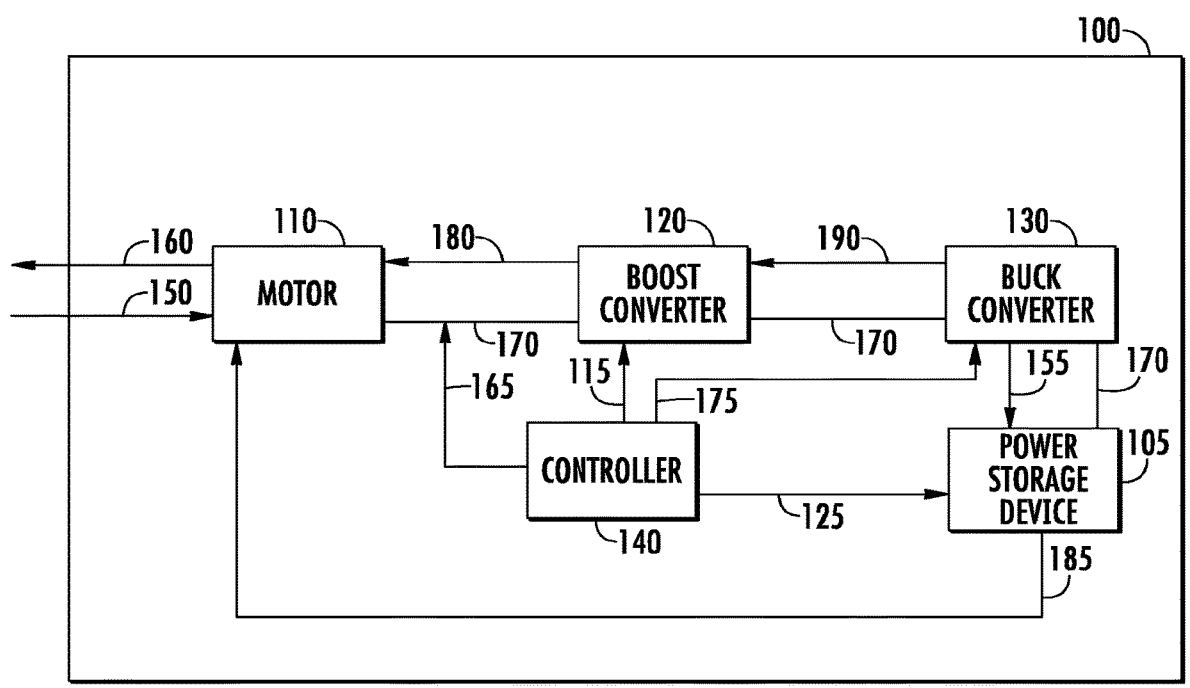
FIG. 1 illustrates a block diagram of an exemplary dynamic energy harvesting and variable harvesting force system.

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

System Overview

FIG. 1 illustrates a block diagram of an exemplary dynamic energy harvesting and variable harvesting force system according to an exemplary embodiment of the present disclosure. A dynamic energy harvesting and variable harvesting force system 100 may be a system that both dynamically harvests energy from a force applied to a motor 110 while also varying a harvesting force applied by the motor 110. The system 100 harvests energy from a force applied to the motor 110, such as a force applied to the rotor of the motor 110, without impacting the harvesting force, such as a force applied by the motor 110 to the rotor of the motor 110, such that the harvesting force applied by the motor 110 remains consistent and provides ease to the user.

For example, the system 100 may be incorporated into a door closer device that enables a user to open and/or close a door. The user applies a force to the door that is transferred to the rotor of the motor 110 that rotates and the system 100 then harvests energy from the force applied to the door by the user. The system 100 then also assists the user in opening and/or closing the door by applying a harvesting force to the motor 110 that assists the user in opening and/or closing the door such that the door does not swing aggressively as well as not having a heavy feel to the user causing the user to struggle in opening and/or closing the door. The energy harvesting and variable harvesting force system 100 may be implemented using the motor 110, a boost converter 120, a buck converter 130, a power storage device 105, and a controller 140.

The motor 110 may be a motor that includes a rotor and is coupled to a mechanism that receives a force 150 and the force 150 is applied to the rotor of the motor 110 causing the rotor to rotate. For example, the motor 110 may be coupled to a mechanism, such as a door closer mechanism, where the user applies the force 150 to a door coupled to the door closer mechanism with the desire to open the door. The force 150 is then applied to the rotor of the motor 110 causing the rotor to rotate. The application of the force 150 to the motor 110 may then transfer to the rotor of the motor 110 rotating at a rotation per minute (RPM) resulting in the force 150 being a torque applied to the motor 110.

The force 150 applied to the motor 150 may be a force, torque, energy and/or any other type of quantum resulting from the force 150 being applied to the motor 110 and causing the rotor of the motor 110 to rotate at an RPM that will be apparent to those skilled in the relevant art(s) without departing from the spirit and scope of the disclosure. The motor 110 may be a three-phase motor and/or any other type of motor that applies a variable harvesting force as well as is able to have energy harvested and stored resulting from the force 150 applied to the motor as will be discussed in detail below that will be apparent to those skilled in the relevant art(s) without departing from the spirit and scope of the disclosure.

In addition to the motor 110 receiving the force 150 applied to the motor 110 causing the rotor to rotate, the motor 110 may also apply a harvesting force 160 that is relative to the force 150 applied to the motor 110. The harvesting force 160 is a force applied by the motor 110 to the mechanism coupled to the motor 110 that is in reaction to the force 150 applied to the motor 110 such that the reaction of the mechanism to the force 150 applied to the motor 110 differs from that of the force 150. Rather than the reaction of the mechanism to the force 150 that is applied by the user to the mechanism and is applied to the motor 150 being a result of the force 150, the harvesting force 160 may be applied by the motor 110 to adjust the reaction of the mechanism to the force 150 to differ from the initial force 150 applied to the mechanism and the motor 110. In doing so, the harvesting force 160 applied by the motor 110 is relative to the force 150 applied by the user to the mechanism. Thus, the harvesting force 160 applied by the motor 110 being relative to the force 150 applied to the motor 110 may improve the user experience in engaging the mechanism coupled to the motor 110 as opposed to if the mechanism simply operated in reaction to the force 150 with no additional influence from the harvesting force 160.

For example, the user applies the force 150 to the door closer mechanism when the user applies the force 150 to the door with the desire to open the door. In doing so, the force 150 is applied to the motor 110 and the rotor of the motor 110 turns at an RPM due to the force 150. Rather than the door closer mechanism continuing to open the door at the RPM triggered by the force 150 applied by the user as well as having the door then close at the RPM triggered by the force 150, the motor 110 applies the harvesting force 160 to the door closer mechanism in reaction to the force 150 applied to the door closer mechanism by the user. The mechanism may be a door closer mechanism, an exercise mechanism for exercise equipment, and/or any other type of mechanism that may transfer the force 150 to rotate the rotor of the motor 110 at an RPM and may in turn receive the harvesting force 160 from the motor 110 that will be apparent to those skilled in the relevant art(s) without departing from the spirit and scope of the disclosure.

In doing so, the harvesting force 160 applied by the motor 110 to the door closer mechanism is relative to the force 150 initially applied to the motor 110 by the user attempting to open the door. The harvesting force 160 applied by the motor 110 to the door closer mechanism may differ from that of the force 150 initially applied to the motor 110 by the user such that the harvesting force 160 may either increase upon the force 150 providing additional boost to the user in opening and/or closing the door and/or decrease upon the force 150 providing additional resistance to the door and slowing the door upon opening and/or closing. Thus, the harvesting force 160 applied by the motor 110 to the door closer mechanism may improve the user experience in engaging the door as opposed to if the door closer mechanism simply operated in reaction to the force 150 without any impact by the harvesting force 160. The harvesting force 160 applied by the motor 110 may be a force, torque, energy and/or any other type of quantum resulting from the harvesting force 160 being applied by the motor 110 to the mechanism in reaction to the force 150 initially applied to the motor 110 that will be apparent to those skilled in the relevant art(s) without departing from the spirit and scope of the disclosure.

The harvesting force 160 applied by the motor 110 may be dynamically adjusted by the controller 140 such that the harvesting force 160 is relative to the force 150 applied to the motor 110. Rather than the harvesting force 160 being a constant harvesting force 160 that is applied by the motor 110 to the mechanism regardless as to the force 150 applied to the motor 110 by the user applying the force 150 to the mechanism, the controller 140 may adjust the harvesting force 160 to be relative to the force 150. In doing so, the controller 140 may dynamically adjust the harvesting force 160 so that the harvesting force 160 is customized to the force 150 and accounts for any deficiency in the force 150 to improve the user experience in engaging the mechanism.

For example, in a first instance the user may apply an increased force 150 to the door in an attempt to open the door thereby applying an increased force 150 to the door closer mechanism resulting in an increased force applied to the motor 110. Simply applying a uniform dynamic force 160 that is applied uniformly to the motor 110 in response to any type of force 150 that is initially applied to the door by the user may not be sufficient to account for the increased force 150 applied to the door in this example and may result in the door still slamming open and then slamming closed causing potential damage and/or injury. Rather, the controller 140 may dynamically adjust the dynamic harvesting force 160 that is applied by the motor 110 to the door closer mechanism to be relative to the increased force 150 applied to the door by the user such that the dynamic force 160 is adjusted relative to the increased force 150 to provide additional resistance to the door to counteract the increased force 150. In doing so, additional resistance is applied to the door closer mechanism by the motor 110 applying the adjusted harvesting force 160 to the door closer mechanism such that the door is slowed in opening as well as closing relative to the increased force 150 initially applied by the user to prevent any damage and/or injury from the opening and/or closing of the door.

In a second instance, the user may apply a decreased force 150 to the door in an attempt to open the door thereby applying a decreased force 150 to the door closer mechanism resulting in a decreased force applied to the motor 110. Simply applying a uniform dynamic force 160 that is applied uniformly to the motor 110 in response to any type of force 150 that is initially applied to the door by the user may not be sufficient to account for the decreased force 150 applied to the door in this example and may result in the user struggling to open the door as well as the door remaining open after the user passes through the door. Rather, the controller 140 may dynamically adjust the dynamic harvesting force 160 that is applied to the motor 110 to the door closer mechanism relative to the decreased force 150 applied to the door by the user such that the dynamic harvesting force 160 is adjusted relative to the decreased force 150 to provide an additional boost to the door to counteract the decreased force 150. In doing so, an additional boost is applied to the door closer mechanism such that the door is boosted in providing additional boost in opening as well as ensuring that the door closes relative to the decreased force 150 initially applied by the user to prevent any damage and/or injury from the opening and/or closing of the door.

In addition to dynamically adjusting the harvesting force 160 that is applied by the motor 110 such that the harvesting force 160 is relative to the force 150 that is applied to the motor 110, the controller 140 may also dynamically adjust harvested energy 155 that is stored by a power storage device 105 such that the stored harvested energy 155 does not impact the harvesting force 160 applied by the motor 110. As the force 150 is applied to the mechanism and in turn is applied to the motor 110 and rotates the rotor of the motor 110 at a RPM, the rotation of the rotor at the RPM as triggered by the force 150 may generate additional energy not required to sufficiently operate the mechanism such that the additional energy may be harvested and stored. The controller 140 may monitor the amount of energy generated by the rotation of the rotor at the RPM as triggered by the force 150 and determine whether additional energy may be harvested from the energy triggered by the force 150 and if so, the controller 140 may enable the power storage device 105 to store the additional energy as harvested energy 155. The storage of the harvested energy 155 by the power storage device 105 may enable the dynamic energy harvesting and variable harvesting force system 100 to be self-sufficient and decrease the reliance of the mechanism on external power sources.

For example, the user applies the force 150 to the door with the desire to open the door. In doing so, the force 150 is applied to the door closer mechanism and in turn is applied to the motor 110 such that the rotor of the motor 110 rotates at an RPM. However, the amount of energy generated by the rotation of the rotor at the RPM is in excess that what is required to be applied back into the door closer mechanism as the harvesting force 160. Thus, the controller 140 enables the excess energy to be harvested and stored as harvested energy 155 by the power storage device 105 rather than having the excess energy wasted.

However, the amount of harvested energy 155 that is harvested from the energy generated by the force 150 applied to the motor 110 may have a negative impact on the dynamic force 160 that is applied by the motor 110 to the mechanism thereby negatively impacting the user experience when an increased amount of harvested energy 155 is stored by the power storage device 105. Further, the current resulting from the rotation of the rotor at the RPM due to the force 150 applied to the motor 110 may continue to increase and damage components of the mechanism, motor, and/or the energy harvesting and harvesting force system 100 when an insufficient amount of harvested energy 155 is harvested and stored by the power storage device 105.

For example, the power storage device 105 may be a power storage device that is greedy in that the power storage device 105 harvests as much energy that is available to be harvested and thereby stores. In such an example, the power storage device 105 harvests as much harvested energy 155 that is available as generated by the rotation of the rotor of the motor 110 at the RPM based on the force 150 that is applied to the rotor of the motor 110 by the user attempting to open the door. In doing so, the amount of harvested energy 155 that is harvested by the power storage device 105 exceeds what is required by the harvesting force 160 to be applied by the motor 110 to the door closer mechanism to adequately react to the force 150 initially applied by the user to the door. Thus, the motor 110 has insufficient energy to incorporate into the harvesting force 160 to apply to the door closer mechanism to adequately react to the force 150 thereby impacting the user experience. In such an example, the harvesting force 160 may have insufficient energy available to adequately provide a boost to the door closer mechanism in reaction to the force 150 applied by the user resulting in the door having a heavy feel causing the user to struggle in opening the door. In such an example, the harvesting force 160 may also have insufficient energy available to adequately provide resistance to the door closer mechanism in reaction to the force 150 applied by the user resulting in the door slamming and causing damage and/or injury.

In another example, the amount of energy available that is in excess of what is required for the harvesting force 160 to be applied by the motor 110 to the door closer mechanism to adequately react to the force 150 may continue to increase as the amount of available energy may not be harvested and stored by the power storage device 105 as the harvested energy 155. The excess of energy may then continue to increase as each time that the user operates the door and applies the force 150 to the door which then is applied to the rotor of the motor 110 by the door closer mechanism causing the rotor to rotate at the RPM when the excess of energy is not required by the harvesting force 160 to adequately react to the force 150. The excess of energy that is not harvested and stored as harvested energy 155 by the power storage device 105 and not incorporated into the harvesting force 160 that is applied by the motor 110 to the door closer mechanism may continue to increase until a level is reached that may cause damage to the components of the mechanism, motor, and/or the energy harvesting and harvesting force system 100.

Thus, the controller 140 may monitor the amount of energy generated by the rotation of the rotor at the RPM as triggered by the force 150 that is applied to the rotor of the motor 110 by the mechanism and dynamically adjust the harvested energy 155 that is harvested and stored by the power storage device 105. In doing so, the controller 140 may enable the appropriate amount of harvested energy 155 to be harvested and stored such that the harvesting force 160 applied by the motor 110 is not impacted and/or damage to components of the mechanism, motor, and/or the energy harvesting and harvesting force system 100 is prevented. In dynamically adjusting the amount of harvested energy 155 that is harvested and stored, the controller 140 may customize the amount of harvested energy 155 that is harvested and stored relative to the force 150 applied to the motor 110 by the mechanism and the harvesting force 160 that is applied by the motor 110 in reaction to the force 150 such that the appropriate amount of harvested energy 155 is harvested and stored regardless of the force 150 applied and the harvesting force 160 required. The dynamic energy harvesting and variable force system 100 may then harvest and store the harvested energy 155 to be self-sufficient and decrease reliance of the mechanism on external power systems without impacting the user experience and/or damaging the components of the mechanism.

Normal Operation (Intermediate RPM Range)

The motor 110 may generate a motor voltage that is triggered by the force 150 applied to the motor 110. As noted above, the force 150 may be applied to the mechanism that is coupled to the rotor of the motor 110 such that the rotor rotates at an RPM. The rotation of the rotor at the RPM may generate a motor voltage such that the magnitude of the motor voltage is relative to the force 150 applied to the motor 110. For example, the motor voltage may increase as the force 150 applied to the rotor of the motor 110 increases thereby causing an increase in the RPM of the rotation of the rotor resulting in an increase in the motor voltage. Based on the motor voltage that is triggered by the force 150 that is applied to the motor 110, the controller 140 may determine the mode of operation that the dynamic energy harvesting and variable force system 100 may operate within. The mode of operation selected by the controller 140 may determine how the dynamic energy harvesting and variable force system 100 may react to the force 150 applied to the motor 110 such that the harvesting force 160 that is applied by the motor 110 to the mechanism is dynamically varied adequately to enhance the user experience and the amount of harvested energy 155 is adequately harvested and stored without impacting the harvesting force 160 applied by the motor 110.

The normal operation of the dynamic energy harvesting and variable harvesting force system 100 may be selected by the controller 140 when the RPM of the rotation of the rotor of the motor 110 resulting from the force 150 applied to the motor is within an intermediate range. The intermediate range of the RPM may be a range that is above a low range of the RPM but below a high range of the RPM such that the dynamic energy harvesting and variable harvesting force system 100 does not have to execute any customized actions to ensure that the harvesting force 160 is dynamically varied adequately to enhance the user experience due to RPMs in the low range and/or high range. Further, the normal operation of the dynamic energy harvesting and variable harvesting force system 100 may also include a range of RPMs in the intermediate range that are typically encountered by the mechanism as the user engages the mechanism as compared to the RPMs that fall in the low range and/or high range. For example, the intermediate RPM range to trigger the normal operation of the dynamic energy harvesting and variable harvesting force system 100 by the controller 140 may range from 2.0 RPM to 15.0 RPM. However, any type of intermediate RPM range to trigger the normal operation of the dynamic energy harvesting and variable harvesting force system 100 by the controller 140 may be selected that will be apparent to those skilled in the relevant art(s) without departing from the spirit and scope of the disclosure.

The controller 140 may monitor the motor voltage as generated by the force 150 applied to the motor 110 via the motor rail 170 that couples the motor 110 to the boost converter 120, the buck converter 130, and the power storage device 105. The controller 140 may monitor the motor voltage via the motor rail 170 with the motor rail signal 165 to determine the motor voltage as well any changes in the motor voltage to thereby adjust the various other components of the dynamic energy harvesting and variable harvesting force system 100. In doing so, the controller 140 may ensure that the harvesting force 160 that is applied by the motor 110 to the mechanism is dynamically varied adequately to enhance the user experience and the amount of harvested energy 155 is adequately harvested and stored without impacting the harvesting force 160 applied by the motor 110.

For example, the controller 140 may monitor the motor voltage via the motor rail 170 with the motor rail signal 165 to determine the mode of operation that the dynamic energy harvesting and variable harvesting force system 100. In such an example, the user may apply the force 150 to the door with the desire to open the door that then pushes on the pinion that is coupled to the door closer mechanism such that the pinion rotates thereby rotating the rotor of the motor 110 at an RPM of 10.0 RPMs. The rotation of the rotor at 10.0 RPMs generates a motor voltage by the motor 110 that is triggered by the force 150 initially applied by the user to the door. The controller 140 may then monitor the motor voltage that corresponds to the 10.0 RPMs of the rotor via the motor rail 170 with the motor rail signal 165 and determine that the dynamic energy harvesting and variable harvesting force system 100 is to operate in the normal mode of operation.

The boost converter 120 may increase the motor voltage as a motor current associated with the motor voltage propagates through the boost converter 120 thereby generating a boost voltage associated with the increased motor current. As noted above, the harvesting force 160 may be applied by the motor 110 to the mechanism in reaction to the force 150 that is applied to the motor 110 via the user applying the force 150 to the mechanism. In generating the force 150, the boost converter 120 may increase the motor voltage that is generated from the rotor of the motor 110 rotating at the RPM caused by the force 150 to the boost voltage. The boost voltage is the voltage level that the motor voltage is to be increased to in order to generate the appropriate harvesting force 160 that is to be applied by the motor 110 to the mechanism to adequately react to the force 150. The boost converter 120 may increase the motor voltage to the boost voltage as the motor current that is associated with the motor voltage and generated by the rotation of the rotor at the RPM caused by the force 150 propagates through the boost converter 120. The boost converter 120 may be a DC-DC converter, a synchronous buck converter, an asynchronous buck converter, a buck-boost converter, a single-ended primary-inductor converter (SEPIC), a cuk converter, a flyback converter, a non-switching converter, a linear regulator, a resistor and/or any other type of device that may increase the motor voltage to thereby generate the boost voltage that will be apparent to those skilled in the relevant art(s) without departing from the spirit and scope of the disclosure.

The controller 140 may monitor the motor voltage as well as the progression of the motor voltage to the boost voltage from the motor rail 170 via the motor rail signal 165. The boost voltage is the voltage detected by the controller 140 on the motor rail 170 when the voltage detected by the controller 140 on the motor rail 170 differs from the motor voltage initially detected by the controller 140 that results from force 150 being applied to the rotor of the motor 110 causing the rotor to rotate at the RPM. Based on the initial force 150 applied to the mechanism by the user that in turn causes the rotation of the rotor at the RPM resulting in the motor voltage generated by the motor 110 and detected by the controller on the motor rail 170, the controller 140 may determine the harvesting force 160 that is to be applied by the motor 110 to the mechanism in reaction to the force 150. In doing so, the controller 140 may instruct the boost converter 120 via the boost signal 115 to increase the motor voltage to the appropriate boost voltage such that the boost converter 120 generates the varied harvesting force 180 and applies the varied harvesting force 180 to the motor 110. The motor 110 may then apply the harvesting force 160 to the mechanism based on the varied harvesting force 180 generated by the boost converter 120 such that the harvesting force 160 applied to the mechanism reacts adequately to the force 150 initially applied to the mechanism.

For example, the user may apply the force 150 to the door that the user desires to open where the force 150 causes the pinion in the door closer mechanism to rotate which triggers the rotor of the motor 110 to rotate at the RPM and generates the motor voltage on the motor rail 170. The controller 140 monitors the motor rail 170 via the motor rail signal 165 to determine the motor voltage. Based on the motor voltage, the controller 140 instructs the boost converter 120 via the boost signal 115 as to the boost voltage that the boost converter 120 is to increase the motor voltage to as the motor current associated with the motor voltage continues to increase as the motor current propagates through the boost converter 120. The controller 140 instructs the boost converter 120 via the boost signal 115 as to the boost voltage that the boost converter is to increase the motor voltage to based on the harvested force 160 that is to be applied by the motor 110 to the door closer mechanism to adequately adjust the resistance and/or boost that is to be applied by the motor 110 to the pinion of the door to react to the force 150. In doing so, the boost converter 120 applies the varied harvesting force 180 based on the boost voltage to the motor 110 and the motor 110 applies the harvesting force 160 to the door closer mechanism thereby applying the resistance and/or boost to the pinion to adequately react to the force 150.

The controller 140 may apply a duty cycle to the boost converter 120 via the boost signal 115 based on the motor voltage that the controller 140 monitors from the motor rail 170 via the motor rail signal 165. The duty cycle applied to the boost converter 120 by the controller 140 corresponds to a magnitude of the harvesting force 160 that is applied to the motor 110. The controller 140 may dynamically adjust the harvesting force 160 applied by the motor 110 by applying the duty cycle applied to the boost converter 120 via the boost signal 115. The duty cycle applied to the boost converter 120 by the controller 140 via the boost signal 115 may instruct the boost converter 120 as to the boost voltage that the boost converter 120 is to increase the motor voltage to such that the varied harvesting force 180 applied to the motor 110 by the boost converter 120 triggers the motor 110 to apply the appropriate harvesting force 160 to the mechanism such that the mechanism adequately reacts to the force 150 initially applied to the mechanism.

The controller 140 may dynamically adjust the harvesting force 160 applied by the motor 110 so that the magnitude of the harvesting force 160 corresponds to the applied duty cycle that is applied to the boost converter 120 that corresponds to the force 150 applied to the motor 110 based on the monitored motor voltage. The controller 140 may determine the duty cycle to apply to the boost converter 120 to dynamically adjust the harvesting force 160 applied by the motor 110 by monitoring the motor voltage as detected by the controller 140 on the motor rail 170 via the boost signal 115. As the force 150 is applied to the mechanism, the rotor of the motor 110 rotates at the RPM and generates the motor voltage that is monitored by the controller 140 on the motor rail 170 via the boost signal 115. Based on the motor voltage that is monitored by the controller 140, the controller 140 may determine the duty cycle to apply to the boost converter 120 such that the harvesting force 160 applied by the motor 110 to the mechanism adequately reacts to the force 150 initially applied to the mechanism.

The duty cycle applied to the boost converter 120 by the controller 140 via the boost signal 115 may correspond to a relationship between the force 150 that is applied to the rotor of the motor 110 and the harvesting force 160 that is applied by the motor 110 to the mechanism. In applying the duty cycle to the boost converter 120, the controller 140 may instruct the boost converter 120 to adjust the varied harvesting force 180 that is applied to the motor 110 in a manner that corresponds to the force 150 that is initially applied to the rotor of the motor 110 based on the relationship between the force 150 and the harvesting force 160 depicted by the duty cycle. In doing so, the controller 140 instructs the boost converter 120 to increase the motor voltage to the appropriate boost voltage such that the motor 110 applies the harvesting force 160 that corresponds to the varied harvesting force 180 in a manner that the harvesting force 160 corresponds to the force 150 based on the relationship between the harvesting force 160 and the force 150 as provided by the duty cycle. Thus, the controller 140 may dynamically adjust the harvesting force 160 applied by the motor 110 to the mechanism such that the harvesting force 160 applied by the motor 110 provides the appropriate boost and/or resistance to the mechanism to adequately respond to the force 150.

For example, the force 150 is applied to the mechanism at a first magnitude such that the rotor of the motor 110 rotates at the RPM based on the force 150 triggering a motor voltage that is generated by the motor 110 and provided on the motor rail 170. Based on the motor voltage monitored by the controller 140 on the motor rail 170 via the motor rail signal 165, the controller 140 applies the duty cycle to the boost converter 120 via the boost signal 115. The duty cycle applied to the boost converter 120 by the controller 140 provides a relationship between the force 150 applied to the rotor of the motor 110 via the mechanism and the harvesting force 160 that is to be applied by the motor 110 to the mechanism. In such an example, the duty cycle provides that the harvesting force 160 that is to be applied by the motor 110 to the mechanism is to be at a second magnitude in relation to the first magnitude of the force 150 initially applied to the rotor of the motor 110. Thus, the controller 140 instructs the boost converter 120 to apply the varied harvesting force 180 at the second magnitude to the motor 110 such that the motor 110 applies the harvesting force 160 at the second magnitude to the mechanism due to the relationship between the force 150 and the harvesting force 160 depicted by the duty cycle.

The duty cycle applied to the boost converter 120 by the controller 140 via the boost signal 115 may correspond to a linear relationship between the force 150 that is applied to the rotor of the motor 110 and the harvesting force 160 that is applied by the motor 110 to the mechanism. As noted above, the user may apply the harvesting force 150 to the mechanism that in turn applies the force 150 to the rotor of the motor 110 causing the rotor of the motor 110 to rotate at the RPM. The rotation of the rotor of the motor 110 at the RPM may be relative to the force 150 initially applied to the mechanism by the user. As the force 150 applied to the mechanism by the user increases, the rotation of the rotor of the motor 110 triggered by the force 150 also increases thereby causing an increase in the RPM of the rotation of the rotor as relative to the force 150 initially applied to the mechanism by the user.

The duty cycle applied to the boost converter 120 by the controller 140 may correspond to a linear relationship between the force 150 and the harvesting force 160 such that the magnitude of the harvesting force 160 applied by the motor 110 to the mechanism corresponds in a linear manner to the RPM of the rotation of the rotor of the motor 110 as triggered by the force 150 initially applied by the user to the mechanism. In applying the duty cycle to the boost converter 120, the controller 140 may instruct the boost converter 120 to adjust the magnitude of the varied harvesting force 180 that is applied to the motor 110 in a linear manner that corresponds to the RPM of the rotor of the motor 110 based on the linear relationship between the RPM of the rotor as triggered by the force 150 and the corresponding magnitude of the harvesting force 160 as depicted by the duty cycle. Thus, the controller 140 may dynamically adjust the magnitude of the harvesting force 160 applied by the motor 110 to the mechanism such that the magnitude of the harvesting force 160 corresponds to the force 150 initially applied to the mechanism by the user in a linear manner thereby providing the appropriate boost and/or resistance to the mechanism to adequately respond to the force 150 initially applied to the mechanism by the user.

For example, the user applied the force 150 to the door closer mechanism to open the door that triggers the rotor of the motor 110 to rotate at the RPM based on the force 150. Based on the RPM, the controller 140 applies the duty cycle to the boost converter 120 via the boost signal 115. The duty cycle applied to the boost converter by the controller 140 provides a linear relationship between the RPM of the rotation of the rotor of the motor 110 as triggered by the force 150 and a magnitude of torque that is to be applied to the door closer mechanism as the harvesting force 160. Thus, the controller 140 instructs the boost converter 120 to apply the magnitude of torque as the varied harvesting force 180 to the motor 110 such that the motor 110 applies the magnitude of torque to the door closer mechanism as the harvesting force 160 due to the linear relationship between the RPM of the rotation of the rotor to the magnitude of torque of the harvesting force 160 depicted by the duty cycle.

The relationship between the force 150 and the harvesting force 160 as depicted by the duty cycle applied by the controller 140 to the boost converter 120 may be a linear relationship, a relationship relative to the RPM of the rotor of the motor 110 to the magnitude of the torque of the harvesting force 160 applied to the mechanism by the motor 110, a relationship between the magnitude of the force 150 and the magnitude of the harvesting force 160, a non-linear relationship between the force 150 and the harvesting force 160 and/or any other type of relationship between the force 150 and the harvesting force 160 such that the controller 140 dynamically adjusts the harvesting force 160 relative to the force 150 to adequately enhance the user experience that will be apparent to those skilled in the relevant art(s) without departing from the spirit and scope of the disclosure.

The controller 140 may dynamically adjust the harvested energy 155 stored by the power storage device 105 by adjusting the boost voltage to be within a boost voltage threshold. The boost voltage when maintained within the boost voltage threshold enables the power storage device 105 to store the harvested energy 155 without impacting the harvesting force 160 applied by the motor 110. As noted above, in addition to dynamically adjusting the harvesting force 160 such that the harvesting force 160 is relative to the force 150 that is applied to the motor 110, the controller 140 may also dynamically adjust the harvested energy 155 that is stored by the power storage device 105 such that the harvested energy 155 does not impact the harvesting force 160 applied by the motor 110. The power storage device 105 may be a capacitor bank, a battery, include one or more lithium ion phosphate (LiFePO$_4$) cells, one or more lead acid cells and/or any other power storage device that is able to harvest and store the harvested energy 155 via the motor rail 170 that will be apparent to those skilled in the relevant art(s) without departing from the spirit and scope of the disclosure.

The controller 140 may monitor the motor rail 170 to monitor the motor voltage to determine the amount of energy generated by the rotation of the rotor at the RPM as triggered by the force 150. As noted above, the rotation of the rotor at the RPM as triggered by the force 150 may generate additional energy not required to sufficiently operate the mechanism such that the additional energy may be harvested and stored. The controller 140 may also monitor the motor rail 170 to monitor the boost voltage to determine the amount of energy being generated by the boost converter 120 as the motor voltage is increased as the motor current associated with the motor voltage continues to propagate through the boost converter 120. The energy generated by the boost converter 120 may be in addition to the initial energy generated by the rotation of the rotor at the RPM as triggered by the force 150. The energy generated by the boost converter 120 that is in addition to the initial energy generated by the rotation of the rotor at the RPM as triggered by the force 150 may also be additional energy not required to sufficiently operate the mechanism such that the additional energy generated by the boost converter 120 may also be harvested and stored. Thus, the controller 140 may enable the power storage device 105 to store the additional energy as harvested energy 155 without impacting the harvesting force 160 applied by the motor 110.

The controller 140 may determine whether the boost voltage is within the boost voltage threshold to determine whether the power storage device 105 is to store the harvested energy 105 as harvested from the energy generated by the rotation of the rotor at the RPM and/or the energy generated by the boost converter 120. The boost voltage threshold is a threshold that when the boost voltage is within the boost voltage threshold, an adequate amount of harvested energy 155 may be stored by the power storage device 105 without having a negative impact on the harvesting force 160 applied to the motor 110 while not damaging components of the mechanism, motor, and/or the system 100. The controller 140 may monitor the motor rail 170 with the motor rail signal 165 to determine whether the boost voltage is within the boost voltage threshold. As the boost voltage fluctuates as monitored by the controller 140 via the motor rail 170 with the motor rail signal 165, the controller 140 may dynamically adjust the harvested energy 155 stored by the power storage device 105 such that the boost voltage is maintained within the boost voltage threshold.

For example, the controller 140 may monitor the boost voltage via the motor rail 170 with the motor rail signal 165 to ensure that the boost voltage does not exceed the boost voltage threshold. In such an example, the power storage device 105 may be a greedy system in that the power storage device 105 harvests as much harvested energy 155 that is available via the motor rail 170 as generated by the rotation of the rotor of the motor 110 at the RPM based on the force 150 that is applied to the rotor of the motor 110 by the user attempting to open the door. In ensuring that the boost voltage does not exceed the boost voltage threshold, the controller 140 may prevent the power storage device 105 from acting as a greedy system and harvesting an increased amount of harvested energy 155 that exceeds what is required by the harvesting force 160 to be applied by the motor 110 to the door closer mechanism to adequately react to the force 150 thereby impacting the user experience.

In another example, the controller 140 may monitor the boost voltage via the motor rail 170 with the motor rail signal 165 to ensure that the boost voltage does not fall below the boost voltage threshold. In such an example, the amount of energy available that is in excess of what is required for the harvesting force 160 to be applied by the motor 110 to the door closer mechanism to adequately react to the force 150 may continue to increase as the boost converter 120 continues to increase the motor voltage each time that the user operates the door. In ensuring that the boost voltage does not fall below the boost voltage threshold, the controller 140 may prevent the excess of energy to continue to increase until a level is reached that may cause damage to the components of the mechanism, motor, and/or the energy harvesting and harvesting force system 100.

The controller 140 may decrease the boost voltage via the boost signal 115 when the boost voltage is higher than the boost voltage threshold to increase the harvested energy 155 stored by the power storage device 105. The controller 140 may monitor the motor rail 170 via the motor rail signal 165 to determine when the boost voltage exceeds the boost voltage threshold. As the boost voltage increases above the boost voltage threshold, the amount of excess energy available to be harvested and stored by the power storage device 105 as harvested energy 155 also increases. The controller 140 may then decrease the boost voltage when the boost voltage is higher than the boost voltage threshold via the boost signal 115 and in doing so increase the amount of harvested energy 155 that is available on the motor rail 170 and may be harvested and stored by the power storage device 105. Thus, the decreasing of the boost voltage via the boost signal 115 to be within the boost voltage threshold thereby triggers the power storage device 105 to harvest and store the harvested energy 155 via the motor rail 170.

For example, the controller 140 may monitor the boost voltage via the motor rail 170 with the motor rail signal 165 to ensure that the boost voltage does not exceed the boost voltage threshold. In such an example, the power storage device 105 may be a capacitor bank that is a greedy system in that the capacitor bank harvests as much harvested energy 155 that is available via the motor rail 170 as generated by the rotation of the rotor of the motor 110 at the RPM based on the force 150 that is applied to the rotor of the motor 110 by the user attempting to open the door. As the boost voltage increases above the boost voltage threshold, the amount of energy available is in excess of what is required for the harvesting force 160 to be applied by the motor 110 to the door closer mechanism to adequately react to the force 150. As the boost voltage increases above the boost voltage threshold, the amount of excess energy also continues to increase.

Thus, the controller 140 may decrease the boost voltage with the boost signal 115 when the boost voltage exceeds the boost voltage threshold thereby increasing the amount of harvested energy 155 that the capacitor bank may harvest and store. The decreasing of the boost voltage by controller via the boost signal 115 when the boost voltage exceeds the boost voltage threshold to bring the boost voltage within the boost voltage threshold by enabling the capacitor bank to harvest and store the harvested energy 155 that is in excess may prevent damage to the components of the mechanism, motor, and/or the energy harvesting and harvesting force system 100.

The controller 140 may increase the boost voltage when the boost voltage is lower than the boost voltage threshold to decrease the harvested energy 155 stored by the power storage device 105 to prevent an increase in the harvesting force 160 applied by the motor 110. The controller 140 may monitor the motor rail 170 via the motor rail signal 165 to determine when the boost voltage exceeds the boost voltage threshold. As the boost voltage threshold decreases below the boost voltage threshold, the amount of excess energy available to be harvested and stored by the power storage device 105 as harvested energy 155 also decreases. The controller 140 may then increase the boost voltage when the boost voltage is lower than the boost voltage threshold via the boost signal 115 and in doing so decrease the amount of harvested energy that is available on the motor rail 170. Thus, the increasing of the boost voltage via the boost signal 115 to be within the boost voltage threshold thereby prevents the power storage device 105 from harvesting and storing the energy available on the motor rail 170 that may be required by the motor 110 to apply the harvesting force 160 to adequately react to the force 150 initially applied to the motor 110.

For example, the controller 140 may monitor the boost voltage via the motor rail 170 with the motor rail signal 165 to ensure that the boost voltage does not exceed the boost voltage threshold. In such an example, the power storage device 105 may be a capacitor bank that is a greedy system in that the capacitor bank harvests as much harvested energy 155 that is available via the motor rail 170 as generated by the rotation of the rotor of the motor 110 at the RPM based on the force 150 that is applied to the rotor of the motor 110 by the user attempting to open the door. As the boost voltage increases and exceeds the boost voltage threshold, the capacitor bank acting as a greedy system may continue to harvest an increased amount of harvested energy 155 that is available via the motor rail 170. In doing so, the harvesting force 160 may have insufficient energy to adequately provide a boost to the door closer mechanism in reaction to the force 150 applied by the user resulting in the door having a heavy feel causing the user to struggle in opening the door. In such an example, the harvesting force 160 may also have insufficient energy available to adequately provide resistance to the door closer mechanism in reaction to the force 150 applied by the user resulting the door slamming and causing damage and/or injury.

Rather, the controller 140 may monitor the boost voltage via the motor rail 170 with the motor rail signal 165 and increase the boost voltage via the boost signal 115 when the boost voltage is lower than the boost voltage threshold to decrease the amount of harvested energy 155 that is harvested and stored by the capacitor bank behaving in a greedy manner. In increasing the boost voltage via the boost signal 115, the controller 140 may prevent the capacitor bank from harvesting and storing energy in a greedy manner that is available on the motor rail 170 that is required by the motor 110 to adequately apply the harvesting force 160 to the door closer mechanism to adequately react to the force 150 initially applied to the door by the user. In doing so, the motor 110 may apply the harvesting force 160 to the door closer mechanism such that the appropriate amount of boost and/or resistance is applied to the door closer mechanism to adequately react to the force 150 initially applied to the door by the user thus enhancing the user experience.

The controller 140 may increase a duty cycle that is applied to the buck converter 130 via the buck converter signal 175 to decrease the boost voltage when the boost voltage is higher than the boost voltage threshold to increase the harvested energy 155 stored by the power storage device 105. The controller 140 may monitor the boost voltage via the motor rail 170 and when the boost voltage exceeds the boost voltage threshold, the controller 140 may instruct the buck converter 130 by applying a duty cycle via the buck converter signal 175 to the buck converter 130. In applying the duty cycle via the buck converter signal 175 to the buck converter 130, the buck converter 130 may generate the bucking signal 190 and may apply the bucking signal 190 to the boost converter 120. The buck signal 190 may then decrease the boost voltage and in doing so increase the amount of harvested energy 155 via the motor rail 170 that is harvested and stored by the power storage device 105. As the boost voltage increases above the boost voltage threshold, the controller 140 may increase the duty cycle via the buck converter signal 175 that is applied to the buck converter 130. In increasing the duty cycle applied to the buck converter 130, the greater amount that the boost voltage is decreased via the bucking signal 190 thereby increasing the amount of harvested energy 155 that is available via the motor rail 170 and is harvested and stored by the power storage device 105. The buck converter 130 may be a DC-DC converter, a synchronous buck converter, an asynchronous buck converter, a buck-boost converter, a SEPIC, a cuk converter, a flyback converter, a non-switching converter, a linear regulator, a resistor and/or any other type of device that may adjust the boost voltage that will be apparent to those skilled in the relevant art(s) without departing from the spirit and scope of the disclosure.

The controller 140 may decrease the duty cycle that is applied to the buck converter 130 via the buck converter signal 175 to increase the boost voltage when the boost voltage is lower than the boost voltage threshold to decrease the harvested energy 155 stored by the power storage device to prevent the increase in the harvesting force 160 applied by the motor 110. As noted above, the power storage device 105 may be a greedy system in that the power storage device 105 may harvest and store any available harvested energy 155 that is available via the motor rail 170. As the boost voltage decreases below the boost voltage threshold, the power storage device 105 may be harvesting and storing an increased amount of harvested energy 155 thereby preventing the motor 110 from having sufficient energy to generate the harvesting force 160 to adequately react to the force 150.

In order to prevent the motor 110 from generating an insufficient harvesting force 160 that may prevent the appropriate amount of resistance and/or boost to be applied by the motor to the mechanism, the controller 140 may decrease the duty cycle that is applied to the buck converter 130 via the buck converter signal 175 to increase the boost voltage to be within the boost voltage threshold. In increasing the duty cycle that is applied to the buck converter 130 via the buck converter signal 175 to increase the boost voltage, the buck converter 130 may decrease the bucking signal 190 that is applied to the boost converter 120. In doing so, the boost converter 120 may continue to increase the boost voltage as the motor current propagates through the boost converter 120 without having the energy that is generated from that propagation being harvested and stored by the power storage device 105 as harvested energy 155.

Thus, the monitoring of the boost voltage via by the controller 140 may enable the controller 140 to dynamically adjust the amount of harvested energy 155 that is harvested and stored by the power storage device 105 by instructing the buck converter 130 as to the bucking to apply to the boost converter 120 to maintain the boost voltage to be within the boost voltage threshold. In doing so, the controller 140 is able to dynamically adjust the harvested energy 155 that is harvested and stored without impacting the harvesting force 160 applied by the motor 110 to the mechanism thereby enhancing user experience.

The controller 140 may monitor the boost voltage generated by the boost converter 120 via the motor rail 170 with the motor rail signal 165 as the motor current associated with the motor voltage propagates through the boost converter 120 to determine when the boost voltage exceeds the energy storage threshold. As the force 150 is applied to the mechanism and in turn is applied to the motor 110 and rotates the rotor of the motor 110 at the RPM thereby generating the motor voltage on the motor rail 170, the motor voltage may increase in becoming the boost voltage as the boost converter 120 increases the motor voltage as the motor current associated with the motor voltage continues to propagate through the boost converter 120. The increase of the boost voltage that exceeds the energy storage threshold may be indicative that additional energy has been generated by the motor 110 as well as the boost converter 120 that is in excess to the energy that is required to generate the harvesting force 160 to adequately react to the force 150. The controller 140 may then activate the boost converter 120 via the boost signal 115 to allow the power storage device 105 to store the harvested energy 155 harvested by the boost converter 120 when the boost voltage exceeds the energy storage threshold.

The controller 140 may instruct the power storage device 105 to provide the stored energy 185 to the motor 110 via the stored energy signal 125 when the motor 110 requires the stored energy 185 to generate the harvesting force 160 to adequately react to the force 150. The harvested energy 155 that is harvested and stored by the power storage device 105 may then be provided to the motor 110 when required by the motor 110 to generate the harvesting force 160 with the appropriate boost and/or resistance to the mechanism to adequately enhance the user experience. The providing of the stored energy 185 by the power storage device 105 to the motor 110 may prevent the motor 110 from relying on external power sources to generate the harvesting force 160 with the appropriate boost and/or resistance to adequately react to the force 150 applied by the user to the mechanism. Thus, the dynamic energy harvesting and variable harvesting force system 100 may be self-sufficient and decrease the reliance of the mechanism on external power sources.

Figure 2:
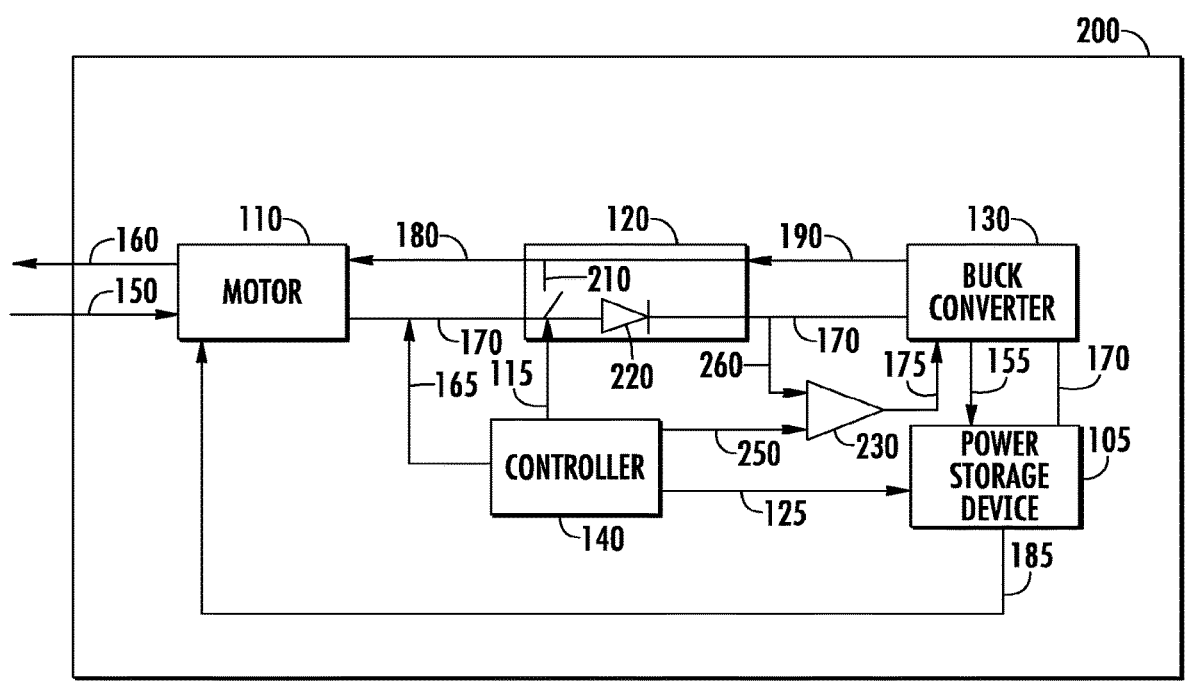
FIG. 2 illustrates a block diagram of an exemplary dynamic energy harvesting and variable harvesting force system.

FIG. 2 is a block diagram of an exemplary dynamic energy harvesting and variable harvesting force system according to an exemplary embodiment of the present disclosure. The dynamic energy harvesting and variable harvesting force system 200 depicts an embodiment of the boost converter 120 that includes a switch 210 and a boost diode 220. The controller 140 may transition the switch 210 into a closed state (logic 1) when the boost converter 120 is to continue to increase the boost voltage as the motor current propagates through the boost converter 120. The controller 140 may transition the switch 210 into an open state (logic 0) when the power storage device 105 is to harvest and store the harvested energy 155.

A comparator 230 may compare the boost voltage 260 to a threshold voltage 250. Based on the comparison of the boost voltage 260 to the threshold voltage 250, the duty cycle applied to the buck converter 130 via the buck converter signal 175 is adjusted thereby triggering the buck converter 130 to increase and/or decrease the boost voltage via the bucking signal 190. The dynamic energy harvesting and variable harvesting force system 200 shares many similar features with the dynamic energy harvesting and variable harvesting force system 100; therefore, only the differences between the dynamic energy harvesting and variable harvesting force system 200 and the dynamic energy harvesting and variable harvesting force system 100 are to be discussed in further detail.

The controller 140 may activate the switch 210 in the boost converter 120 to allow the power storage device 105 to store the harvested energy 155 harvested by the boost converter 120 when the boost voltage exceeds the energy storage threshold. As noted above the increase of the boost voltage that exceeds the energy storage threshold may be indicative that additional energy has been generated by the motor 110 as well as the boost converter 120 that is in excess to the energy that is required to generate the harvesting force 160 to adequately react to the force 150. The controller 140 may then activate the switch 210 via the boost signal 115 to transition the switch from the closed state (logic 1) to the open state (logic 0) to allow the motor current that has been propagating through the boost converter to be released onto the motor rail 170. The released motor current that continued to increase as the motor current propagated through the boost converter 120 as the switch was in the closed state (logic 1) may then be released onto the motor rail 170 as the harvested energy 155 such that the power storage device 105 may harvest and store the harvested energy 155 now available on the motor rail 170 due to the switch transitioning into the open state (logic 0).

The controller 140 may adjust the duty cycle applied to the buck converter 130 so that the boost voltage is within the boost voltage threshold to dynamically adjust the harvested energy 155 stored by the power storage device 105 without impacting the harvesting force 160 applied by the motor when the boost voltage exceeds the energy storage threshold. The controller 140 may apply a threshold voltage 250 to the comparator 230. The threshold voltage 250 may be the threshold voltage that the controller 140 requests that the boost voltage threshold be set at. For example, the controller 140 may determine that the boost voltage threshold is 20V. In such an example, the controller 140 may request that the boost voltage be maintained at the boost voltage threshold of 20V to ensure that the power storage device 105 does not greedily harvest and store the harvested energy 155 that exceeds what is required by the motor 110 to generate the harvesting force 160 to adequately react to the force 150 while ensuring that the excess energy is harvested and stored by the power storage device 105 to prevent damage caused by an increased boost voltage.

The boost voltage 260 may also be applied to the comparator 230. The comparator 230 may compare the threshold voltage 250 as provided by the controller 140 to the boost voltage 260 as determined from the motor rail 170. As the boost voltage 260 exceeds the threshold voltage 250, the amount of motor current that is propagating in the boost converter 120 continues to increase as the switch 210 is in the closed state (logic 1). As the switch 210 remains in the closed state (logic 1), the amount of motor current that is propagating in the boost converter 120 continues to increase thereby increasing the boost voltage 260 that is applied to the comparator 230. As the boost voltage 260 exceeds the threshold voltage 250 applied by the controller 140 to the comparator 230, there is harvested energy 155 available to be harvested and stored by the power storage device 105 that exceeds the energy required by harvesting force 160 to be applied by the motor 110 to adequately react to the force 150 applied by the user.

As the boost voltage 260 exceeds the threshold voltage 250, the controller 140 may instruct the switch 210 to transition from the closed state (logic 1) to the open state (logic 0) via the boost signal 115. As the switch 210 transitions from the closed state (logic 1) to the open state (logic 0), the motor current propagating in the boost converter 120 may become available on the motor rail 170 as the harvested energy to be harvested and stored by the power storage device 105. The duty cycle applied to the buck converter 130 via the buck converter signal 175 may be dynamically adjusted such that the duty cycle applied to the buck converter 130 may be increased thereby decreasing the boost voltage via the bucking signal 190. The duty cycle applied to the buck converter 130 via the buck converter signal 175 may continue to be increased until the buck converter 130 has decreased the boost voltage 260 via the buck converter signal 175 until the boost voltage 260 is within the threshold voltage 250 as detected by the comparator 230.

As the boost voltage 260 is below the threshold voltage 250, the amount of motor current that is propagating in the boost converter 120 continues to be harvested and stored by the power storage device 105 as harvested energy 155 as the switch 210 is in the open state (logic 0) thereby allowing the motor current to be available via the motor rail 170 and to be greedily harvested and stored by the power storage device 105. As the switch 210 remains in the open state (logic 0), the amount of motor current that is available via the motor rail 170 continues to be greedily harvested and stored by the power storage device 105 thereby decreasing the boost voltage 260 that is applied to the comparator 230. As the boost voltage 260 is below the threshold voltage 250 applied by the controller 140 to the comparator 230, there is insufficient energy available for the harvesting force 160 to be applied by the motor 110 to adequately react to the force 150 due to the power storage device 105 greedily harvesting and storing 105 any harvested energy 155 that is available via the motor rail 170.

As the boost voltage 260 is below the threshold voltage 250, the controller 140 may instruct the switch 210 to transition from the open state (logic 0) to the closed state (logic 1) via the boost signal 115. As the switch 210 transitions to the open state (logic 0) to the closed state (logic 1), the motor current propagating in the boost converter 120 may no longer be available on the motor rail 170 as the harvested energy 155 to be harvested and stored by the power storage device 105. Rather, the motor current may continue to propagate within the boost converter 120 with the switch 210 transitioned into the closed state (logic 1) and thereby continue to increase with the power storage device 105 unable to greedily store and harvest the motor current as harvested energy 155 via the motor rail 170. The duty cycle applied to the buck converter 130 via the buck converter signal 175 may be dynamically adjusted such that the duty cycle applied to the buck converter 175 may be decreased thereby increasing the boost voltage via the bucking signal 190. The duty cycle applied to the buck converter 130 via the buck converter signal 175 may continue to be decreased until the buck converter 130 has increased the boost voltage 260 via the buck converter signal 175 until the boost voltage 260 is within the threshold voltage 250 as detected by the comparator 230.

Thus, the application of the threshold voltage 250 by the controller 140 and the boost voltage 260 via the motor rail 170 to the comparator 230 may enable the amount of harvested energy 155 that is harvested and stored by the power storage device 105 to be dynamically adjusted. The comparison of the threshold voltage 250 to the boost voltage 260 may enable the duty cycle applied to the buck converter 130 to be dynamically adjusted to maintain the boost voltage to be within the boost voltage threshold. In doing so, the controller 140 is able to dynamically adjust the harvested energy 155 that is harvested and stored without impacting the harvesting force 160 applied by the motor 110 to the mechanism thereby enhancing user experience.

In an embodiment, the controller may 140 activate the buck converter 130 at a fixed duty cycle when the boost voltage 260 is at a first value as compared to a first threshold voltage 250 and then deactivate the buck converter 130 when the boost voltage 260 is at a second value as compared to a threshold voltage 250. As noted above, the boost voltage 260 may be applied to the comparator 230. Rather than simply having a single threshold voltage 250 also applied to the comparator 230 and then dynamically adjusting the duty cycle that is applied to the buck converter 130 based on the single threshold voltage 250, two different threshold voltages 250 may be applied to the comparator 230 and the buck converter 130 may be activated and/or deactivated based on the boost voltage 260 in comparison to the first threshold voltage 250 and the second threshold voltage 250.

For example, the first threshold voltage 250 may be 22V. As the boost voltage 260 increases above the first threshold voltage 250 of 22V, the amount of motor current propagating in the boost converter 120 may continue to increase and there is an excess amount of energy available for the power storage device 105 to harvest and store as harvested energy 155. The boost converter signal 175 may then activate the buck converter 130 at a fixed duty cycle such that the buck converter 130 bucks the boost voltage via the bucking signal 190 to decrease the boost voltage while enabling the power storage device 105 to harvest and store the harvested energy 155.

In such an example, the second threshold voltage 250 may be 18V. As the boost voltage 260 decreases below the second threshold voltage 260b of 18V, the amount of motor current propagating in the boost converter 120 may be greedily harvested and stored by the power storage device 105 such that there is insufficient energy available for the motor 110 to generate the harvesting force 160 to adequately react to the force 150 applied by the user. The boost converter signal 175 may then deactivate the buck converter 130 and no longer apply the fixed duty cycle to the buck converter 130 such that the buck converter 130 no longer bucks the boost voltage via the bucking signal 190 to increase the boost voltage while to prevent the power storage device 105 from greedily harvesting and storing the harvested energy 155.

Figure 3A:
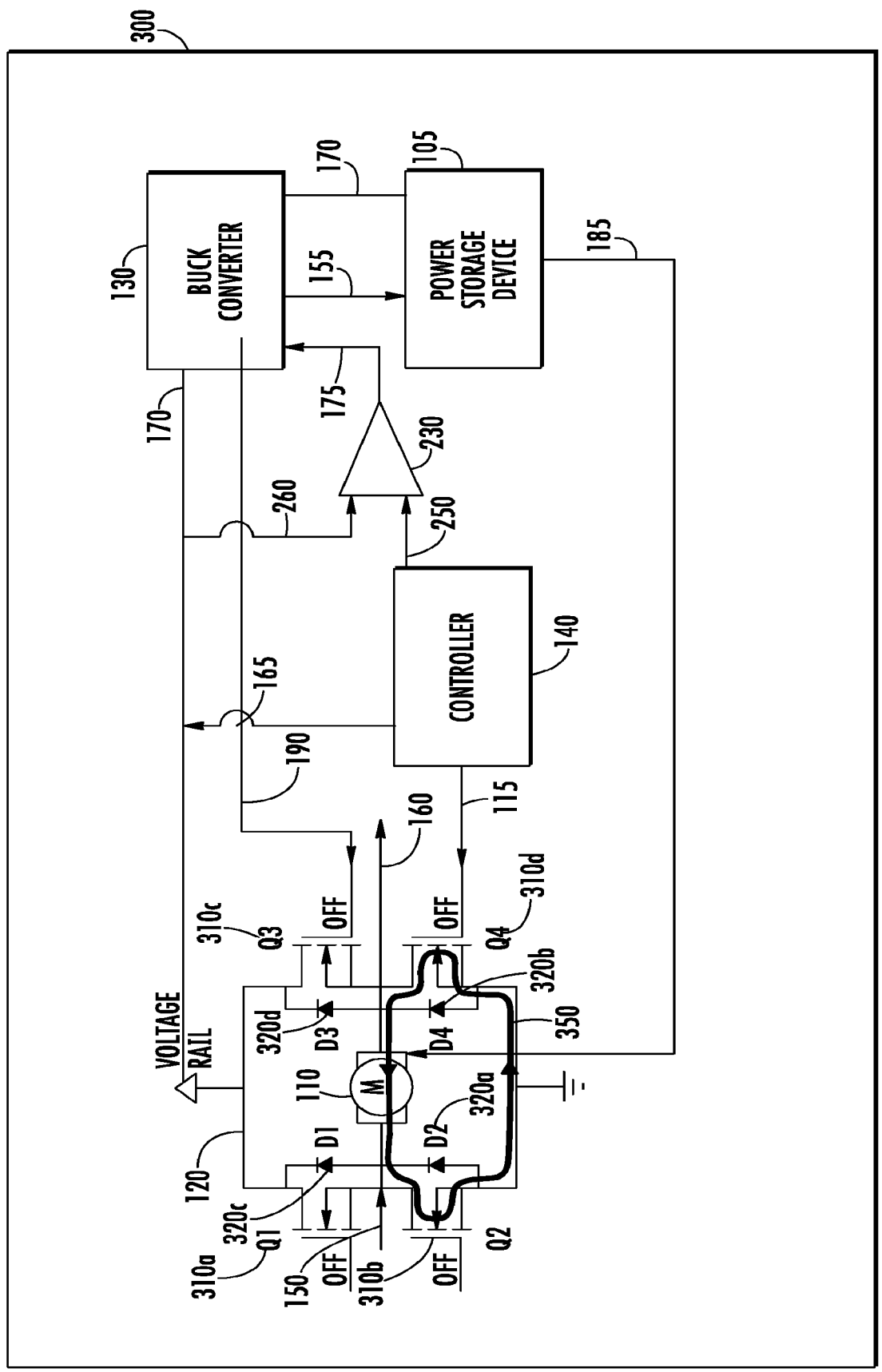
FIG. 3A illustrates a block diagram of an exemplary dynamic energy harvesting and variable harvesting force system.

FIG. 3A is a block diagram of an exemplary dynamic energy harvesting and variable harvesting force system according to an exemplary embodiment of the present disclosure. The dynamic energy harvesting and variable harvesting force system 300 depicts an embodiment of the of the boost converter 120 that includes a plurality of field-effect transistors (FETs) 310a-310d, where d is an integer equal to four, and a plurality of boost diodes 320(a-d), where d is an integer equal to four. The controller 140 may apply a duty cycle to the boost converter 120 via the boost signal 115 where the controller 140 applies the boost signal 115 to an input of the boost converter 120 which is the FET 310d. In applying the boost signal 115 to the FET 310d, the FET 310d transitions to the ON state (logic 1) as well as the FET 310b transitions to the ON state (logic 1) while FET 310a and FET 310c remain in the OFF state (logic 0). In doing so, the motor current 350 continues to propagate through the boost converter 120 thereby increasing the boost voltage. The dynamic energy harvesting and variable harvesting force system 300 shares many similar features with the dynamic energy harvesting and variable harvesting force systems 100 and 200; therefore, only the differences between the dynamic energy harvesting force system 300 and the dynamic energy harvesting and variable harvesting force systems 100 and 200 are to be discussed in further detail.

The controller 140 may apply the selected duty cycle via the boost signal 115 to the boost converter 120 based on the motor voltage where the boost converter 120 includes an H-bridge configuration. The H-bridge configuration includes the structure of the FETs 310(*a-d*) and the boost diodes 320(*a-d*) as depicted in the boost converter 120 in FIG. 3A. The controller 140 may then dynamically adjust the harvesting force 160 applied by the motor 110 so that the magnitude of the harvesting force 160 corresponds to the selected duty cycle that is applied to the H-bridge circuit that corresponds to the force 150 applied to the motor 110. The controller 140 may adjust the adjust the duty cycle applied to the buck converter 130 so that the boost voltage is within the boost voltage threshold to dynamically adjust the harvested energy 155 stored by the power storage device 105 as the harvesting force 160 applied by the motor 110 is dynamically adjusted without impacting the harvesting force 160 applied by the motor 110.

The controller 140 may apply the duty cycle to the input of the boost converter 120 in FET 310*d* via the boost signal 115 based on the motor voltage that the controller 140 monitors from the motor rail 170 via the motor rail signal 165. In an embodiment, the controller 140 may apply the duty cycle to the FET 310*d* via a pulse-width modulation (PWM) signal as the boost signal 115. The duty cycle applied to the FET 310*d* by the controller via the PWM signal as the boost signal 115 corresponds to a magnitude of the harvesting force 160 that is applied by the motor 110. The controller 140 may dynamically adjust the harvesting force 160 that is applied by the motor 110 by applying the PWM signal to the FET 310*d* via the boost signal 115.

The H-bridge configuration of the boost converter 120 may enable the controller 140 to activate the FET 310*d* by applying the PWM signal to the FET 310*d* such that the FET 310*d* transitions from the OFF state (logic 0) to the ON state (logic 1). In activating the FET 310*d* by applying the PWM signal to the FET 310*d* with the appropriate duty cycle, the FET 310*b* may also transition from the OFF state (logic 0) to the ON state (logic 1). However, FETs 310*a* and 310*c* may remain in the OFF state (logic 0) due to the H-bridge configuration.

The transitioning of the FETs 310*d* and 310*b* from the OFF state (logic 0) to the ON state (logic 1) by applying the appropriate duty cycle via the PWM signal to the FET 310*d* may enable the motor current 350 to propagate within the boost converter 120. In doing so, the motor current 350 may continue to propagate from the motor 110 and through the FET 310*b* and the FET 310*d* due to the FETs 310*b* and 310*d* being in the ON state (logic 1). As the motor current 350 continues to propagate from the motor 110 and through the FETs 310*b* and 310*d*, the boost voltage continues to increase thereby continuing to increase the amount of energy being generated by the boost converter 120. With the FETs 310*b* and 310*d* being in the ON state (logic 1) and the FETs 310*a* and 310*c* being in the OFF state (logic 0), the motor current 350 may not be available on the motor rail 170 as the harvested energy 155 to be harvested and stored by the capacitor bank. Rather, the motor current 350 may continue to propagate within the boost converter 120 with the FETs 310*b* and 310*d* transitioned into the ON state (logic 1) and the FETs 310*a* and 310*c* transitioned into the OFF state (logic 0) and thereby continue to increase with the capacitor bank unable to greedily store and harvest the motor current 350 as harvested energy 155 via the motor rail 170.

The duty cycle applied to the buck converter 130 via the buck converter signal 175 may then be dynamically adjusted such that the duty cycle applied to the buck converter 175 may be decreased thereby increasing the boost voltage via the bucking signal 190. The duty cycle applied to the buck converter 130 via the buck converter signal 175 may continue to be decreased until the buck converter 130 has increased the boost voltage 260 via the buck converter signal 175 until the boost voltage 260 is within the threshold voltage 250 as detected by the comparator 230.

Figure 3B:
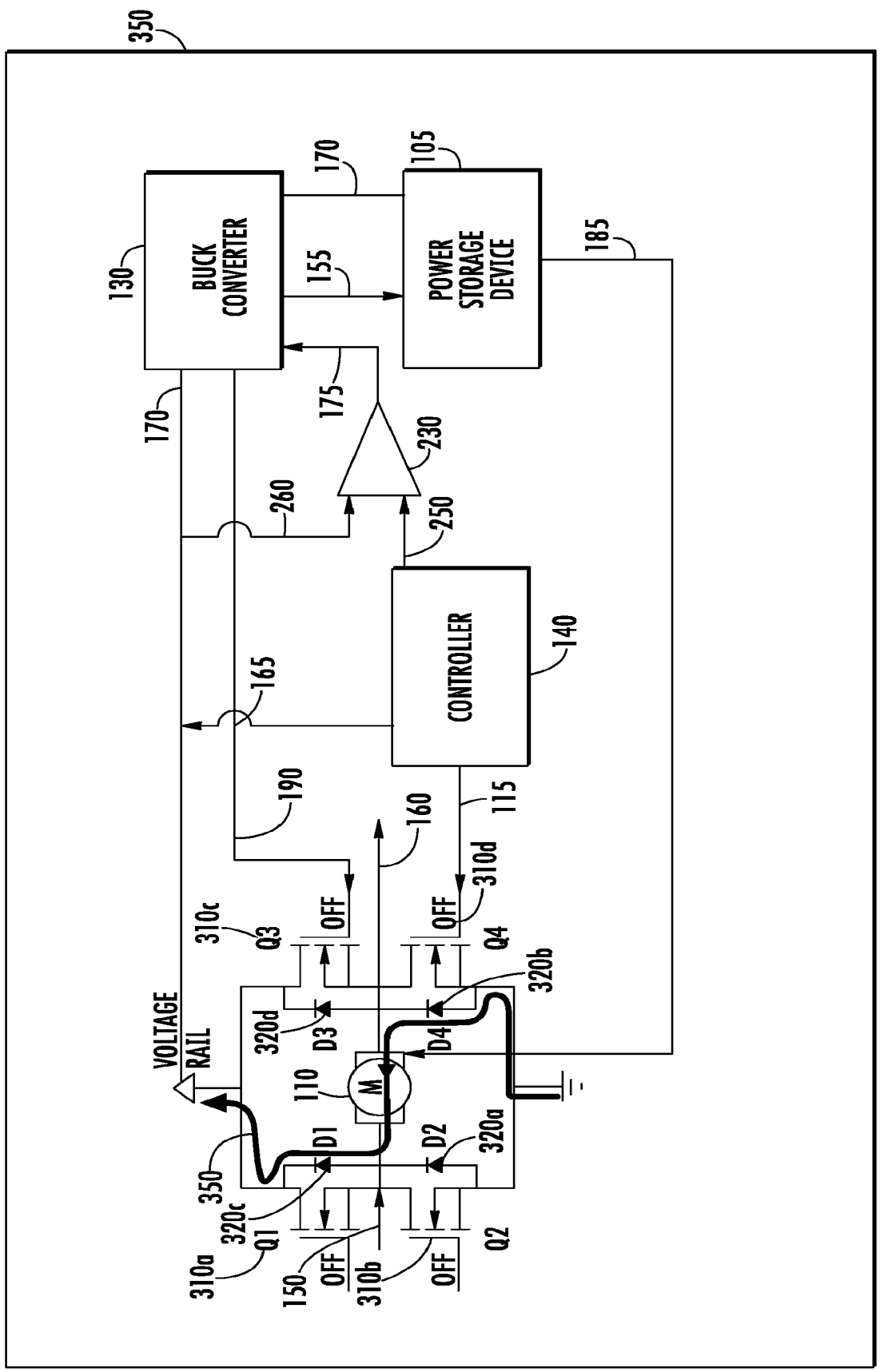
FIG. 3B illustrates a block diagram of an exemplary dynamic energy harvesting and variable harvesting force system.

FIG. 3B is a block diagram of an exemplary dynamic energy harvesting and variable harvesting force system according to an exemplary embodiment of the present disclosure. The dynamic energy harvesting and variable harvesting force system 350 depicts an embodiment of the boost converter 120 where the controller 140 ceases applying the duty cycle via the boost signal 115 to the input of the boost converter 130 which is the FET 310*d*. In no longer applying the duty cycle to the FET 310*d*, the FET 310*d* transitions to the OFF state (logic 0) as well as the FET 310*b* transitions to the OFF state (logic 0) while FETs 310*a* and 310*d* remain in the OFF state (logic 0). In doing so, boost diodes 320*b* and 320*c* are transitioned into the ON state (logic 1) and the motor current 350 propagates to the motor rail 170 such that the motor current 350 may be harvested and stored by the power storage device 105 as the harvested energy 155. The dynamic energy harvesting and variable harvesting force system 350 shares many similar features with the dynamic energy harvesting and variable harvesting force systems 100, 200, and 300; therefore, only the differences between the dynamic energy harvesting force system 350 and the dynamic energy harvesting and variable harvesting force systems 100, 200, and 300 are to be discussed in further detail.

The controller 140 may no longer apply the duty cycle via the PWM signal to the FET 310*d* to allow the capacitor bank to store the harvested energy 155 when the boost voltage exceeds the energy storage threshold. As noted above, the increase of the boost voltage that exceeds the energy storage threshold may be indicative that additional energy has been generated by the motor 110 as well as the boost converter 120 that is in excess to the energy that is required to generate the harvesting force 160 to adequately react to the force 150. The controller 140 may then no longer apply the duty cycle via the PWM signal to the FET 310*d*. In doing so, the FET 310*d* and the FET 310*b* transition from the ON state (logic 1) to the OFF state (logic 0). The FET 310*a* and 310*c* may also remain in the OFF state (logic 0).

As the FETs 310(*a-d*) remain in the OFF state, the motor voltage may continue to increase until the motor voltage forward biases the boost diode 320*c* of the FET 310*a*. The boost diode 320*b* may also become forward biased allowing the motor current 350 propagate up through the boost diode 320*b* and the boost diode 320*c* and up to the motor rail 170. The released motor current 350 that continued to increase as the motor current 350 propagated through the motor 110, the FET 310*d*, and the FET 310*b* as depicted in FIG. 3A may then be released onto the motor rail 170 as the harvested energy 155 such that the capacitor bank may harvest and store the harvested energy 155 now available on the motor rail 170 due to FETs 310(*a-d*) being in the OFF state (logic 0).

As the boost voltage 260 is below the threshold voltage 250, the amount of motor current 350 that is propagating in the H-bridge of the boost converter 120 continues to be harvested and stored by the power storage device 105 as harvested energy 155 as the FETs 310(*a-d*) are in the OFF state (logic 0) thereby allowing the motor current 350 to be available via the motor rail 170 and to be greedily harvested and stored by the capacitor bank. As the FETs 310(*a-d*) remain in the OFF state (logic 0), the amount of motor current 350 that is available via the motor rail 170 continues to be greedily harvested and stored by the capacitor bank.

The configuration of the FETs 310(*a-d*) and the boost diodes 320(*a-d*) in the H-bridge configuration may include any type and any quantity of switching devices and/or boosting devices to adequately enable the controller 140 to transition the boost converter 120 between increasing the motor current 350 that continues to propagate through the boost converter 120 and increase without being accessed by the power storage device 105 and to allowing the motor current 350 to propagate through the boost converter 120 and onto the motor rail 170 to be harvested and stored by the power storage device as the harvested energy 155 that will be apparent to those skilled in the relevant art(s) without departing from the spirit and scope of the disclosure.

Slow Operation (Low RPM Range)

Figure 4:
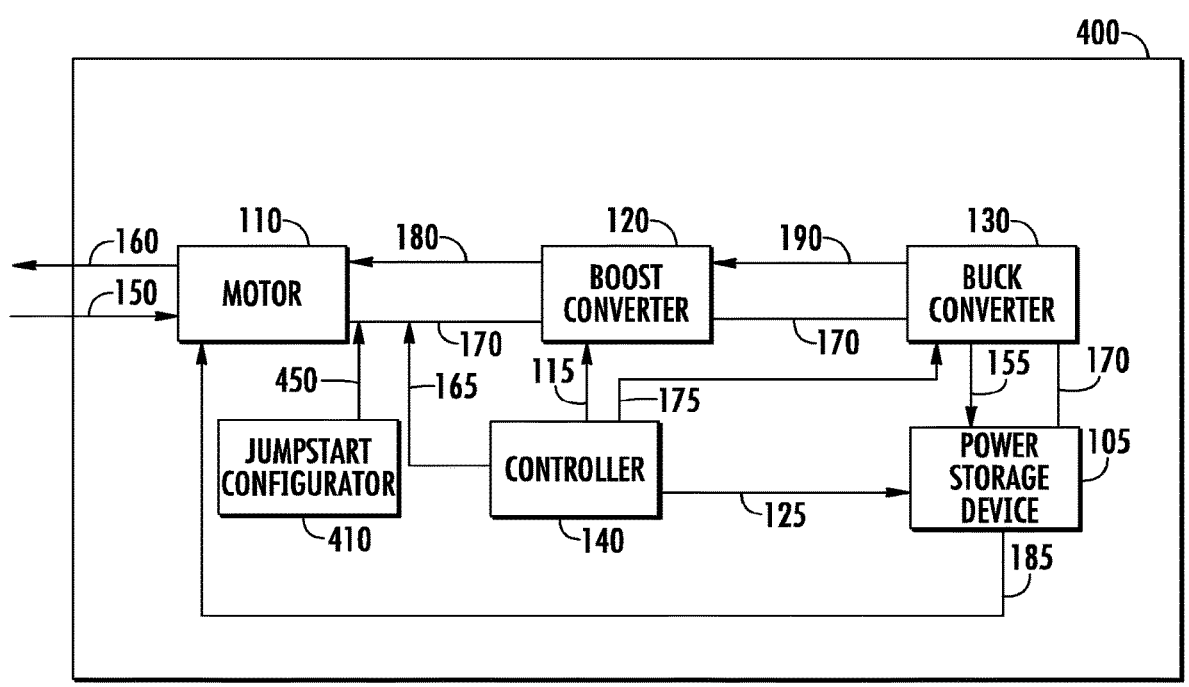
FIG. 4 illustrates a block diagram of an exemplary dynamic energy harvesting and variable harvesting force system.

FIG. 4 is a block diagram of an exemplary dynamic energy harvesting and variable harvesting force system according to an exemplary embodiment of the present disclosure. As noted above, based on the motor voltage that is triggered by the force 150 that is applied to the motor 110, the controller 140 may determine the mode of operation that the dynamic energy harvesting and variable force system 400 may operate within. The mode of operation selected by the controller 140 may determine how the dynamic energy harvesting and variable force system 400 may react to the force 150 applied to the motor 110 such that the harvesting force 160 that is applied by the motor 110 to the mechanism is dynamically varied adequately to enhance the user experience and the amount of harvested energy 155 is adequately harvested and stored without impacting the harvesting force 160 applied by the motor 110.

The slow operation of the dynamic energy harvesting and variable harvesting force system 400 may be selected by the controller 140 when the RPM of the rotation of the rotor of the motor 110 resulting from the force 150 applied to the motor 110 is within a low range. The low range of the RPM may be a range that is below the intermediate range of the RPM such that the dynamic energy harvesting and variable harvesting force system 400 does not have to execute any customized actions to ensure that the harvesting force 160 is dynamically varied adequately to enhance the user experience due to RPMs in the low range and/or high range. For example, the low RPM range to trigger the slow operation of the dynamic energy harvesting and variable harvesting force system 400 by the controller 140 may be less than 2.0 RPM. However, any type of low RPM range to trigger the slow operation of the dynamic energy harvesting and variable harvesting force system 400 by the controller 140 may be selected that will be apparent to those skilled in the relevant art(s) without departing from the spirit and scope of the disclosure.

The slow operation of the dynamic energy harvesting and variable harvesting force system 400 may be initiated by a force 150 of low magnitude being exerted to the mechanism. The force 150 of low magnitude may generate the rotation of the rotor of the motor 110 in a low RPM range, such as less than 2.0 RPMs. The rotation of the rotor of the motor 110 in the low RPM range may then in turn generate a motor voltage that is low in magnitude. The motor voltage being low in magnitude may be insufficient to wake up the controller 140 such that the controller 140 is activated and functions as discussed in detail above regarding the normal operation of the dynamic energy harvesting and variable harvesting force system 100. The motor voltage being low in magnitude may also be insufficient to activate the boost converter 120 such that the boost converter 120 is activated and increases the motor voltage to generate the harvesting force 160 to adequately react to the force 150. Without the controller 140 and the boost converter 120 activated and functioning as discussed in detail above regarding the normal operation of the dynamic energy harvesting and variable harvesting force system 100, the motor 110 may be unable to generate the harvesting force 160 to adequately react to the force 150 thereby negatively impacting the user experience.

For example, the user may attempt to open the door by applying the force 150 of low magnitude such that the force 150 applied to the pinion of the door closer mechanism is less than 2.0 RPMs. The rotation of the pinion at less than 2.0 RPMs may generate a motor voltage that is less than 1.8V. However, the controller 140 may require that a minimum of 1.8V be applied to the motor rail 170 to have the controller 140 wake up such that the controller 140 is activated and functioning as discussed in detail above regarding the normal operation of the dynamic energy harvesting and variable harvesting force system 100. Further, the boost converter 120 may require that a minimum of 3.3V be applied to the motor rail 170 such that the boost converter 120 is activated and functioning as discussed in detail above regarding the normal operation of the dynamic energy harvesting and variable harvesting force system 100. Without the activation of the controller 140 and the boost converter 120, the motor 110 may be unable to apply the harvesting force 160 to the door closer mechanism such that the harvesting force 160 provides sufficient boost to assist the user in opening the door.

Rather than simply not activating thereby failing to generate the harvesting force 160 to adequately react to the force 150 and negatively impacting the user experience, a dynamic energy harvesting and variable harvesting force system 400 may increase the motor voltage to a motor voltage threshold that is adequate to activate the controller 140 and the boost converter 120 such that the dynamic energy harvesting and variable harvesting force system 400 operates as discussed in detail above regarding the normal operation. A jumpstart configurator 410 may increase the motor voltage generated from the rotation of the rotor of the motor 110 at the low RPMs such that the motor voltage increases above a motor voltage threshold that may be sufficient to activate the controller 140 and the boost converter 120 such that the dynamic energy harvesting and variable harvesting force system 400 operates in normal operation. The dynamic energy harvesting and variable harvesting force system 400 shares many similar features with the dynamic energy harvesting and variable harvesting force systems 100, 200, 300, and 350; therefore, only the differences between the dynamic energy harvesting force and variable harvesting force system 400 and the dynamic energy harvesting and variable harvesting force systems 100, 200, 300, and 350 are to be discussed in further detail.

As the user applies the force 150 that is low in magnitude such that the rotor of the motor 110 rotates at the low RPM, the jumpstart configurator 410 may be monitoring the motor rail 170 with the monitoring signal 450. The jumpstart configurator 410 may monitor the motor rail 170 for a motor voltage that is below a motor voltage threshold but greater than 0V. A motor voltage that is 0V may be indicative that the user is not applying the force 150 to the mechanism as the rotor of the motor 110 is not rotating thereby not generating a motor voltage. For example, a motor voltage of 0V may be indicative that the user is not attempting to open the door as the pinion of the door closer mechanism is not rotating thereby not generating a motor voltage. However, a motor voltage that is greater than 0V but less than the motor voltage threshold may be indicative that the user is applying the force 150 to the mechanism causing the rotor of the motor 110 to rotate thereby generating a motor voltage but the motor voltage being below the motor voltage threshold is insufficient to activate the controller 140 and the boost converter 120.

As the jumpstart configurator 410 monitors the motor rail 170 with the monitoring signal 450, the jumpstart configurator 410 may increase the motor voltage as detected by the monitoring signal 450 to above the motor voltage threshold via the motor rail 170 such that the controller 140 and the boost converter 120 may access the increased motor voltage via the motor rail 170. The jumpstart configurator 410 may increase the motor voltage via the motor rail 170 such that the motor voltage is increased to a sufficient level to wake up the controller 140 and activate the controller 140 such that the controller 140 operates in normal mode as discussed in detail above. The jumpstart configurator 410 may also increase the motor voltage via the motor rail 170 such that the motor voltage is increased to a sufficient level to activate the boost converter 120 such that the boos converter 120 operates in a normal mode as discussed in detail above. Thus, the dynamic energy harvesting force and variable harvesting force system 400 may be able to generate the harvesting force 160 to adequately react to the force 150 thereby enhancing the user experience despite the initial force 150 as applied by the user being a low magnitude.

In an embodiment, the jumpstart configurator 410 may include a Darlington NPN transistor that may activate when the rotation of the rotor of the motor 110 at the low RPM generates the motor voltage that is below the motor voltage threshold. The Darlington NPN may be activated when the rotor of the motor 110 rotates and generates the motor voltage that is applied to the motor rail 170 and is below the motor voltage threshold. The Darlington NPN may be activated when the monitoring signal 450 senses the motor voltage that is below the motor voltage threshold but is applied to the motor rail 170. The activation of the Darlington NPN transistor at the motor voltage below the motor voltage threshold may then trigger the jumpstart configurator 410 to generate a PWM signal that is applied to the controller 140 and the boost converter 120. The generation of the PWM signal that is applied to the controller 140 and the boost converter 120 may activate the controller 140 and the boost converter 120 such that each operate in the normal mode.

In an embodiment, the jumpstart configurator 410 may include bipolar junction transistors (BJTs) that may be activated when the motor voltage reaches 0.7V. The jumpstart configurator 410 may monitor the motor rail 170 via the monitoring signal 450 to determine when the rotation of the rotor of the motor 110 generates the motor voltage that is applied to the motor rail 170. As the motor voltage that is applied to the motor rail 170 reaches 0.7V, the BJTs may be activated via the monitoring signal 450. The activation of the BJTs when the motor voltage reaches 0.7V may be sufficient to activate the jumpstart configurator 410. The jumpstart configurator 410 with the activated BJTs may then increase the motor voltage via the motor rail 170 with the monitoring signal 450 to 1.8V which may be the motor voltage threshold to activate the controller 140. As the jumpstart configurator 410 increases the motor voltage to 1.8V at the motor rail 170, the controller 140 may be activated via the motor rail 170. The jumpstart configurator 410 with the activated BJTs may continue to increase the motor voltage via the motor rail 170 to the monitoring signal 450 to 3.3V which may be the motor voltage threshold to activate the boost converter 120. As the jumpstart configurator 410 increases the motor voltage to 3.3V at the motor rail 170, the boost converter 120 may be activated via the motor rail 170.

In an embodiment, the jumpstart configurator 410 may include a direct current (DC) rectification circuit that may rectify the motor voltage to 1.8V that is sufficient to satisfy the motor voltage threshold to activate the controller 140. In such an embodiment, the DC rectification circuit may include Schottkey diodes that may rectify the motor voltage such that the motor voltage reaches the 1.8V that is sufficient to activate the controller 140. The jumpstart configurator 410 may also include an external bypass depletion-mode FET in order to adjust the motor voltage to 3.3V to activate the boost converter 120. The depletion-mode FET may be in the ON state and then turn off when the motor voltage exceeds the motor voltage threshold. The depletion-mode FET may enable the controller 140 to be activated and generate the PWM signal that is applied to the BJTs that are coupled to the motor 110. The BJTs when activated by the PWM signal may couple the phases of the motor 110 to ground that may enable the motor current 350 to begin propagating through the boost converter 120. After the BJTs are deactivated, the motor current 350 may propagate through a rectifying diode such that the rectifying diode may boost the motor voltage from 1.8V to 3.3V at the motor rail 170 which is sufficient to activate the boost converter 120 to operate in the normal mode.

The jumpstart configurator 410 may include any type of configuration such that the jumpstart configurator 410 is able to increase the motor voltage when below the motor voltage threshold to sufficient levels to adequately activate the controller 140 and the boost converter 120 that will be apparent to those skilled in the relevant art(s) without departing from the spirit and scope of the disclosure.

Fast Operation (High RPM Range)

As noted above, based on the motor voltage that is triggered by the force 150 that is applied to the motor 110, the controller 140 may determine the mode of operation that the dynamic energy harvesting and variable force system 100 may operate within. The mode of operation selected by the controller 140 may determine how the dynamic energy harvesting and variable force system 100 may react to the force 150 applied to the motor 110 such that the harvesting force 160 that is applied by the motor 110 to the mechanism is dynamically varied adequately to enhance the user experience and the amount of harvested energy 155 is adequately harvested and stored without impacting the harvesting force 160 applied by the motor 110.

The fast operation of the dynamic energy harvesting and variable harvesting force system 100 may be selected by the controller 140 when the RPM of the rotation of the rotor of the motor 110 resulting from the force 150 applied to the motor 110 is within a high range. The high range of the RPM may be a range that is above the intermediate range of the RPM such that the dynamic energy harvesting and variable harvesting force system 100 does not have to execute any customized actions to ensure that the harvesting force 160 is dynamically varied adequately to enhance the user experience due to RPMs in the low range and/or high range. For example, the high RPM range to trigger the fast operation of the dynamic energy harvesting and variable harvesting force system 100 by the controller 140 may be higher than 18 RPM. However, any type of high RPM range to trigger the fast operation of the dynamic energy harvesting and variable harvesting force system 100 by the controller 140 may be selected that will be apparent to those skilled in the relevant art(s) without departing from the spirit and scope of the disclosure.

The fast operation of the dynamic energy harvesting and variable harvesting force system 100 may be initiated by a force 150 of high magnitude being exerted to the mechanism. The force 150 of high magnitude may generate the rotation of the rotor of the motor 110 in a high RPM range, such as more than 18.0 RPMs. The rotation of the rotor of the motor 110 in the high RPM range may then in turn generate a motor voltage that is high in magnitude. The motor voltage being high in magnitude may result in damage caused to the components included in the dynamic energy harvesting and variable harvesting force system 100 as discuss in detail above.

For example, the user may attempt to open the door by applying the force 150 of high magnitude such that the force 150 applied to the pinion of the door closer mechanism is greater than 18.0 RPMs. The rotation of the pinion at greater than 18.0 RPMs may generate a motor voltage that is higher than 20V. As the motor voltage increases above 20V, the risk in causing damage to the components of the dynamic energy harvesting and variable harvesting force system 100 also increases. Without the decreasing the motor voltage to be at 20V, damage to the components of the dynamic energy harvesting and variable harvesting force system 100 may occur.

Rather than simply allowing the motor voltage to increase above the boost voltage threshold, the dynamic energy harvesting and variable harvesting force system 100 may increase the harvested energy 155 that is harvested and stored by the power storage device 105. The significant increase in the motor voltage above the boost voltage threshold due to the increase in the RPMs of the rotation of the rotor of the motor 110 may allow the power storage device 105 to harvest and store an increased amount of harvested energy 155. As discussed in detail above, the power storage device 105 may increase the amount of harvested energy 155 harvested and stored thereby decreasing the motor voltage to be within the boost voltage threshold.

As the controller monitors the motor rail 170 with the motor rail signal 165, the controller 140 may determine that the motor voltage is increasing significantly due to an increase in the RPMs that the rotor of the motor 110 rotates. The significant increase in the motor voltage due to the significant increase in the RPMs that the rotor of the motor 110 rotates may trigger the controller 140 to generate the buck converter signal 175 such that the duty cycle applied to the buck converter 130 via the buck converter signal 175 may be increased significantly. The increasing of the duty cycle applied to the buck converter 130 may result in the buck converter 130 significantly increasing the bucking signal 190 applied to the boost converter 120. The significant increase in the bucking signal 190 applied to the boost converter 120 may result in a significant increase of the harvested energy 155 that is harvested and stored by the power storage device 105.

The power storage device 105 may harvest and store an increased amount of harvested energy 155 to a level where the harvesting force 160 is impacted such that the harvesting force 160 may have insufficient energy available to provide the adequate boost to the mechanism thereby generating a heavier feel to the user. However, the amount of force 150 initially applied to the mechanism by the user generating the increase in the RPMs of the rotation of the rotor of the motor 110 may be indicative that the user is not in need of an adequate boost to be applied to the mechanism via the harvesting force 160. Rather, a heavier feel applied to the mechanism may be adequate to provide sufficient resistance to the mechanism to prevent damage to the mechanism. Further the increase in the harvested energy 155 may be required to prevent damage to the components of the dynamic energy harvesting and variable harvesting force system 100.

System Overview

Figure 5:
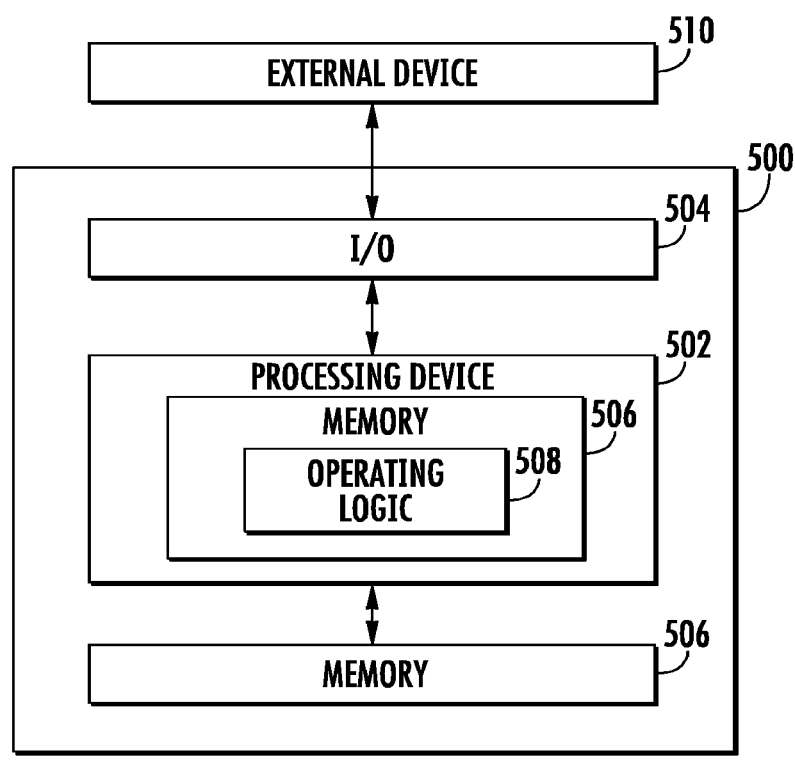
FIG. 5 illustrates a block diagram of an exemplary controller as incorporated into an exemplary dynamic energy harvesting and variable harvesting force system.

Referring now to FIG. 5, a simplified block diagram of at least one embodiment of a computing device 500 is shown. The illustrative computing device 500 depicts at least one embodiment of a controller 140 for the dynamic energy harvesting and variable harvesting force system 100 illustrated in FIG. 1. Depending on the particular embodiment, computing device 500 may be embodied as a reader device, credential device, door control device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communications device capable of performing the functions described herein.

The computing device 500 includes a processing device 502 that executes algorithms and/or processes data in accordance with operating logic 508, an input/output device 504 that enables communication between the computing device 500 and one or more external devices 510, and memory 506 which stores, for example, data received from the external device 510 via the input/output device 504.

The input/output device 504 allows the computing device 500 to communicate with the external device 510. For example, the input/output device 504 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, WiMAX, etc.) to effect such communication depending on the particular computing device 500. The input/output device 504 may include hardware, software, and/or firmware suitable for performing the techniques described herein.

The external device 510 may be any type of device that allows data to be inputted or outputted from the computing device 500. For example, in various embodiments, the external device 510 may be embodied as controller 140 dynamic energy harvesting and variable harvesting force system 100. Further, in some embodiments, the external device 510 may be embodied as another computing device, switch, diagnostic tool, controller, printer, display, alarm, peripheral device (e.g., keyboard, mouse, touch screen display, etc.), and/or any other computing, processing, and/or communications device capable of performing the functions described herein. Furthermore, in some embodiments, it should be appreciated that the external device 510 may be integrated into the computing device 500.

The processing device 502 may be embodied as any type of processor(s) capable of performing the functions described herein. In particular, the processing device 502 may be embodied as one or more single or multi-core processors, microcontrollers, or other processor or processing/controlling circuits. For example, in some embodiments, the processing device 502 may include or be embodied as an arithmetic logic unit (ALU), central processing unit (CPU), digital signal processor (DSP), and/or another suitable processor(s). The processing device 502 may be a programmable type, a dedicated hardwired state machine, or a combination thereof. Processing devices 502 with multiple processing units may utilize distributed, pipelined, and/or parallel processing in various embodiments. Further, the processing device 502 may be dedicated to performance of just the operations described herein, or may be utilized in one or more additional applications. In the illustrative embodiment, the processing device 502 is of a programmable variety that executes algorithms and/or processes data in accordance with operating logic 508 as defined by programming instructions (such as software or firmware) stored in memory 506. Additionally or alternatively, the operating logic 508 for processing device 502 may be at least partially defined by hardwired logic or other hardware. Further, the processing device 502 may include one or more components of any type suitable to process the signals received from input/output device 504 or from other components or devices and to provide desired output signals. Such components may include digital circuitry, analog circuitry, or a combination thereof The memory 506 may be of one or more types of non-transitory computer-readable media, such as a solid-state memory, electromagnetic memory, optical memory, or a combination thereof. Furthermore, the memory 506 may be volatile and/or nonvolatile and, in some embodiments, some or all of the memory 506 may be of a portable variety, such as a disk, tape, memory stick, cartridge, and/or other suitable portable memory. In operation, the memory 506 may store various data and software used during operation of the computing device 500 such as operating systems, applications, programs, libraries, and drivers. It should be appreciated that the memory 506 may store data that is manipulated by the operating logic 508 of processing device 502, such as, for example, data representative of signals received from and/or sent to the input/output device 504 in addition to or in lieu of storing programming instructions defining operating logic 508. As shown in FIG. 5, the memory 506 may be included with the processing device 502 and/or coupled to the processing device 502 depending on the particular embodiment. For example, in some embodiments, the processing device 502, the memory 506, and/or other components of the computing device 500 may form a portion of a system-on-a-chip (SoC) and be incorporated on a single integrated circuit chip.

In some embodiments, various components of the computing device 500 (e.g., the processing device 502 and the memory 506) may be communicatively coupled via an input/output subsystem, which may be embodied as circuitry and/or components to facilitate input/output operations with the processing device 502, the memory 506, and other components of the computing device 500. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 500 may include other or additional components, such as those commonly found in a typical computing device (e.g., various input/output devices and/or other components), in other embodiments. It should be further appreciated that one or more of the components of the computing device 500 described herein may be distributed across multiple computing devices. In other words, the techniques described herein may be employed by a computing system that includes one or more computing devices. Additionally, although only a single processing device 502, I/O device 504, and memory 506 are illustratively shown in FIG. 5, it should be appreciated that a particular computing device 500 may include multiple processing devices 502, I/O devices 504, and/or memories 506 in other embodiments. Further, in some embodiments, more than one external device 510 may be in communication with the computing device 500.

Door Closer Control Device System Overview

Figure 6:
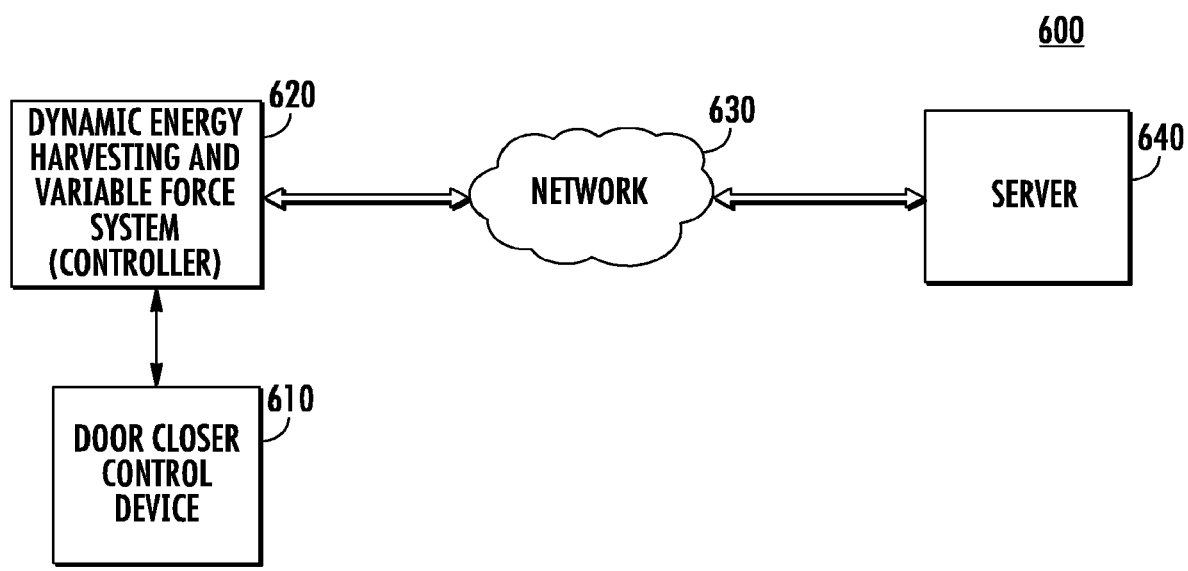
FIG. 6 illustrates a block diagram of an exemplary door closer device configuration that incorporates the dynamic energy harvesting and variable force systems.

FIG. 6 is a block diagram of an exemplary door closer device configuration 600 that incorporates the dynamic energy harvesting and variable force systems discussed in detail above. For example, the door closer device configuration 600 may incorporate the dynamic energy harvesting and variable force system 100 into the dynamic energy harvesting and variable force system 620 which operates as the controller for the door closer control device 610. In doing so, the dynamic energy harvesting and variable force system 620 as operating as the controller of the door closer control device 610 may control one or more components of the door closer control device 610 as the door closer control device 610 operates. For example, the door closer control device 610 may be a locking system and the dynamic energy harvesting and variable force system 620 may determine when the door latch of the locking mechanism included in the door closer control device 610 is to extend when the door closer control device 610 is to be locked and when the door latch is to retract when the door closer control device 610 is to be unlocked.

The door closer control device 610 that the dynamic energy harvesting and variable force system 620 may act as the controller for may include but is not limited to door closers, door operators, auto-operators, credential readers, hotspot readers, electronic locks including mortise, cylindrical, and/or tabular locks, exit devices, panic bars, wireless reader interfaces, gateway devices, plug-in devices, peripheral devices, doorbell camera systems, door closer control surveillance systems and/or any other type of door closer control device that regulates door closer to a space that will be apparent to those skilled in the relevant art(s) without departing from the spirit and scope of the disclosure.

The dynamic energy harvesting and variable force system 620 when operating as the controller for the door closer control device 610 may control one or more components of the door closer control device 610 as the door closer control device 610 operates such as but not limited to, extending/retracting a door latch, engaging/disengaging a dogging mechanism on an exit device, opening/closing a door via a door closer/operator, moving a primer mover, controlling an electric motor, and/or any other type of action that enables the door closer control device 610 to regulate the opening and/or closing of a door that provides access to a space that will be apparent to those skilled in the relevant art(s) without departing from the spirit and scope of the disclosure.

The dynamic energy harvesting and variable force system 620 when operating as the controller for the door closer control device 610 may receive data from the door closer control device 610 as well any type of component included in the door closer control device 610 that may provide data to the dynamic energy harvesting and variable force system 620 for the dynamic energy harvesting and variable force system 620 to adequately instruct the door closer control device 610 as to how to operate to adequately regulate how the door opens and/or closes to provide access to the space.

For example, sensors included in a locking mechanism may send data to the dynamic energy harvesting and variable force system 620 indicating that a person has departed from the door after the door closed behind the person. The dynamic energy harvesting and variable force system 620 may then instruct the door latch to extend thereby locking the door. The dynamic energy harvesting and variable force system 620 may receive data from any type of component included in the door closer control device 610 that includes but is not limited to sensors, credential readers, biometric sensing devices, user interface devices, and/or any other component that may provide data to the dynamic energy harvesting and variable force system 620 to adequately instruct the door closer control device 610 to execute actions to regulate door closer to the space that will be apparent to those skilled in the relevant art(s) without departing from the spirit and scope of the disclosure.

The dynamic energy harvesting and variable force system 620 may communicate to with the door closer control device 610 via wire-line communication and/or wireless communication. The dynamic energy harvesting and variable force system 620 may engage in wireless communication with the door closer control device 610 that includes but is not limited to Bluetooth, BLE, Wi-Fi, and/or any other wireless communication protocol that will be apparent to those skilled in the relevant art(s) without departing from the spirit and scope of the disclosure.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. A dynamic energy harvesting and variable harvesting force system, comprising:
   a motor configured to generate a motor voltage by a force applied to the motor;
   a boost converter configured to adjust the motor voltage as a motor current associated with the motor voltage propagates through the boost converter;
   a power storage device configured to store energy harvested by the boost converter when the boost voltage exceeds an energy storage threshold;
   a controller configured to:
      dynamically adjust a harvesting force applied by the motor so that the harvesting force is relative to the force applied to the motor; and
      dynamically adjust the energy stored by the power storage device via adjustment in motor voltage.

2. The dynamic energy harvesting and variable harvesting force system of claim 1, wherein the boost converter is further configured to increase the motor voltage as a motor current associated with the motor voltage propagates through the boost converter thereby generating the boost voltage associated with the increased motor current.

3. The dynamic energy harvesting and variable harvesting force system of claim 2, wherein the controller is further configured to:
   dynamically adjust the harvested energy stored by the power storage device by adjusting the boost voltage to be within a boost voltage threshold, and wherein the boost voltage when maintained within the boost voltage threshold enables the power storage device to store the harvested energy without impacting the harvesting force applied by the motor.

4. The dynamic energy harvesting and variable harvesting force system of claim 1, wherein the controller is further configured to:
   monitor the motor voltage triggered by the force applied to the motor;
   apply a duty cycle to the boost converter based on the motor voltage, wherein a selected duty cycle corresponds to a magnitude of the harvesting force that is applied to the motor; and
   dynamically adjust the harvesting force applied by the motor so that the magnitude of the harvesting force corresponds to the duty cycle applied to the boost converter that corresponds to the force applied to the motor based on the monitored motor voltage.

5. The dynamic energy harvesting and variable harvesting force system of claim 1, wherein the controller is further configured to:
   monitor the boost voltage generated by the boost converter as the motor current associated with the motor voltage propagates through the boost converter to determine when the boost voltage exceeds the energy storage threshold; and
   activate the boost converter to allow the power storage device to store the energy harvested by the boost converter when the boost voltage exceeds the energy storage threshold.

6. The dynamic energy harvesting and variable harvesting force system of claim 1, wherein the controller is further configured to:
   decrease the boost voltage when the boost voltage is higher than the boost voltage threshold to increase the harvested energy stored by the power storage device; and
   increase the boost voltage when the boost voltage is lower than the boost voltage threshold to decrease the harvested energy stored by the power storage device to prevent an increase in the harvesting force applied by the motor.

7. The dynamic energy harvesting and variable harvesting force system of claim 1, wherein the controller is further configured to:

increase a duty cycle that is applied to a buck converter to decrease the boost voltage when the boost voltage is higher than the boost voltage threshold to increase the harvested energy stored by the power storage device; and decrease the duty cycle that is applied to the buck converter to increase the boost voltage when the boost voltage is lower than the boost voltage threshold to decrease the harvested energy stored by the power storage device to prevent the increase in the harvesting force applied by the motor.

8. A method for dynamically adjusting harvesting of energy and dynamically varying a harvesting force applied to a motor, comprising:

generating a motor voltage by a force applied to the motor;

adjusting the motor voltage as a motor current associated with the motor voltage propagates through a boost converter;

storing energy harvested by the boost converter when the boost voltage exceeds an energy storage threshold;

dynamically adjusting the harvesting force applied by the motor so that the harvesting force is relative to the force applied to the motor; and dynamically adjusting the harvested energy stored by the power storage device via adjustment in the motor voltage.

9. The method of claim 8, wherein the adjusting of the motor voltage comprises:

increasing the motor voltage as a motor as the motor current associated with the motor voltage propagates through the boost converter thereby generating the boost voltage associated with the increased motor current.

10. The method of claim 8, wherein the dynamic adjusting of the harvested energy comprises:

dynamically adjusting the harvested energy stored by the power storage device by adjusting the boost voltage to be within a boost voltage threshold, wherein the boost voltage when maintained within the boost voltage threshold enables the power storage device to store the harvested energy without impacting the harvesting force applied by the motor.

11. The method of claim 8, wherein the dynamic adjusting of the harvesting force comprises:

monitoring the motor voltage triggered by the force applied to the motor;

applying a duty cycle to the boost converter based on the motor voltage, wherein a selected duty cycle corresponds to a magnitude of the harvesting force that is applied to the motor; and dynamically adjusting the harvesting force applied by the motor so that the magnitude of the harvesting force corresponds to the duty cycle applied to the boost converter that corresponds to the force applied to the motor based on the monitored motor voltage.

12. The method of claim 8, wherein the dynamic adjusting of the harvested energy further comprises:

monitoring the boost voltage generated by the boost converter as the motor current associated with the motor voltage propagates through the boost converter to determine when the boost voltage exceeds the energy storage threshold; and activating the boost converter to allow the power storage device to store the energy harvested by the boost converter when the boost voltage exceeds the energy storage threshold.

13. The method of claim 8, wherein the dynamically adjusting of the harvested energy further comprises:

decreasing the boost voltage when the boost voltage is higher than the boost voltage threshold to increase the harvested energy stored by the power storage device; and increasing the boost voltage when the boost voltage is lower than the boost voltage threshold to decrease the harvested energy stored by the power storage device to prevent an increase in the harvesting force applied by the motor.

14. The method of claim 8, wherein the dynamically adjusting of the harvested energy further comprises:

increasing a duty cycle that is applied to a buck converter to decrease the boost voltage when the boost voltage is higher than the boost voltage threshold to increase the harvested energy stored by the power storage device; and decreasing the duty cycle that is applied to the buck converter to increase the boost voltage when the boost voltage is lower than the boost voltage threshold to decrease the harvested energy stored by the power storage device to prevent the increase in the harvesting force applied by the motor.

15. A system for dynamically harvesting energy and dynamically varying a harvesting force of a door closer control device, the system comprising:

a motor associated with the door closer control device that is configured to generate a motor voltage by a force applied to the motor;

a power storage device associated with the door closer control device that is configured to store energy harvested from the motor that is generated by rotational movement of a pinion; and a controller associated with the door closer control device that is configured to:

determine whether the rotational movement of the pinion based on the force applied to the motor is within an intermediate range of operation that is above a low range of operation and below a high range of operation that does not require additional adjustment to a harvesting force applied to the motor to compensate for the rotational movement of the pinion that is in the low range of operation and/or the high range of operation, dynamically adjust the harvesting force applied to the motor so that the harvesting force is relative to the force applied to the motor when the rotational movement of the pinion is in the intermediate range of operation, and dynamically adjust the harvested energy stored by the power storage device based on the motor voltage.

16. The system of claim 15, wherein the intermediate range for the rotational movement of the pinion is between 2.0 RPM and 15.0 RPM.

17. The system of claim 15, wherein the controller is further configured to:

determine whether the rotational movement of the pinion based on the force applied to the motor is within a low range of operation that fails to exceed a motor voltage threshold, wherein the motor voltage threshold when exceeded by the motor voltage activates the controller and fails to activate the controller when the motor voltage is below the motor voltage threshold.

18. The system of claim 15, further comprising a jump-start configurator that is configured to:

increase the motor voltage to exceed the motor voltage threshold to activate the controller so that the controller dynamically adjusts the harvesting force applied to the motor so that the harvesting force is relative to the force applied to the motor as when in the intermediate range of operation.

19. The system of claim 15, wherein the controller is further configured to:

determine whether the rotational movement of the pinion based on the force applied to the motor is within a high range of operation that triggers an increased risk of damage to the door closer control device;

dynamically increase the harvested energy stored by the power storage device to decrease the motor voltage that is increased by an increase in the force applied to the motor in the high range of operation when the rotational movement of the pinion is in the high range of operation; and dynamically adjust the harvesting force applied to the motor so that the harvesting force increases to decrease the force applied to the motor when the rotational movement of the pinon is in the high range of operation.

20. The system of claim 19, wherein the high range for the rotational movement of the pinion is greater than 15.0 RPM.

* * * * *